(12) United States Patent
Thompson, Jr. et al.

(10) Patent No.: US 6,672,451 B1
(45) Date of Patent: Jan. 6, 2004

(54) CONVEYOR BELT SYSTEM

(75) Inventors: Victor H. Thompson, Jr., Burleson, TX (US); Benon C. Jarka, Fort Worth, TX (US)

(73) Assignee: Vic Thompson Company, Fort Worth, TX (US)

( * ) Notice: Subject to any disclaimer, the term of this patent is extended or adjusted under 35 U.S.C. 154(b) by 0 days.

(21) Appl. No.: 10/271,399

(22) Filed: Oct. 15, 2002

Related U.S. Application Data

(63) Continuation of application No. 09/525,775, filed on Mar. 14, 2000, now Pat. No. 6,471,048.
(60) Provisional application No. 60/125,600, filed on Mar. 19, 1999.

(51) Int. Cl.[7] .............................................. B65G 17/38
(52) U.S. Cl. ..................... 198/853; 198/850; 198/841; 198/852
(58) Field of Search ................................ 198/853, 852, 198/841, 850

(56) References Cited

U.S. PATENT DOCUMENTS

| | | |
|---|---|---|
| 3,231,066 A | 1/1966 | Harrison et al. |
| 3,870,141 A | 3/1975 | Lapeyre et al. |
| 4,080,842 A | 3/1978 | Lapeyre et al. |
| 4,213,527 A | 7/1980 | Lapeyre et al. |
| 4,222,483 A | 9/1980 | Wootton et al. |
| 4,742,907 A | 5/1988 | Palmaer |
| 4,765,454 A | 8/1988 | Hodlewsky et al. |
| 4,821,872 A | 4/1989 | Lapeyre |
| 4,832,187 A | 5/1989 | Lapeyre |
| 4,865,183 A | 9/1989 | Hodlewsky et al. |
| 4,901,844 A | 2/1990 | Palmaer et al. |
| 4,925,013 A | 5/1990 | Lapeyre |
| 4,934,517 A | 6/1990 | Lapeyre |
| 4,934,518 A | 6/1990 | Lapeyre |
| 4,941,568 A | 7/1990 | Lapeyre |
| 4,949,838 A | 8/1990 | Lapeyre et al. |
| 4,953,693 A | 9/1990 | Draebel |
| 4,993,544 A | 2/1991 | Bailey et al. |
| 5,069,330 A | 12/1991 | Palmaer et al. |
| 5,156,260 A | 10/1992 | Dorner et al. |
| 5,174,439 A | 12/1992 | Spangler et al. |
| 5,181,601 A | 1/1993 | Palmaer et al. |
| 5,224,583 A | 7/1993 | Palmaer et al. |
| 5,310,045 A | 5/1994 | Palmaer et al. |
| 5,310,046 A | 5/1994 | Palmaer et al. |
| 5,358,096 A | 10/1994 | Faulkner et al. |
| 5,372,248 A | 12/1994 | Horton |
| 5,419,428 A | 5/1995 | Palmaer et al. |
| 5,431,275 A | 7/1995 | Faulkner |
| 5,439,099 A | 8/1995 | Bos et al. |
| 5,547,071 A | 8/1996 | Palmaer et al. |
| 5,573,105 A | 11/1996 | Palmaer |
| 5,613,597 A | 3/1997 | Palmaer et al. |
| 5,645,160 A | 7/1997 | Palmaer et al. |

OTHER PUBLICATIONS

KVP brochure, pp. 6–63, published by KVP Systems, Inc., Rancho Cordova, CA.
Introlox Product Line Update–Mar. 1994, pages Product Line 2–1 through 2–64 Product, Line.

*Primary Examiner*—Donald P. Walsh
*Assistant Examiner*—Jeffrey A. Shapiro
(74) *Attorney, Agent, or Firm*—Geoffrey A. Mantooth

(57) ABSTRACT

A conveyor belt is made up of plastic links that are capable of traversing a radiused or curved path. The links are provided with a cover member, such as a plate. Articles to be conveyed are put on top of the plates. The links are interconnected together so as to reduce the exposure of gaps between the links. Each link has a slot on the ends, with the slot receiving a guiderail or track. Each slot has a convex inside surface which contacts the guiderail. The belt is supported by side frames, which side frames have lips that form the tracks. Each side frame has an upper lip and a lower lip. Thus, the side frames can support and guide both an upper portion of the conveyor belt as well as a lower portion of the conveyor belt in a self contained assembly. The side frames are coupled together by cross beams to provide the support, as well as provide a path of the tracks. The side frames are coupled to vertical supports.

9 Claims, 23 Drawing Sheets

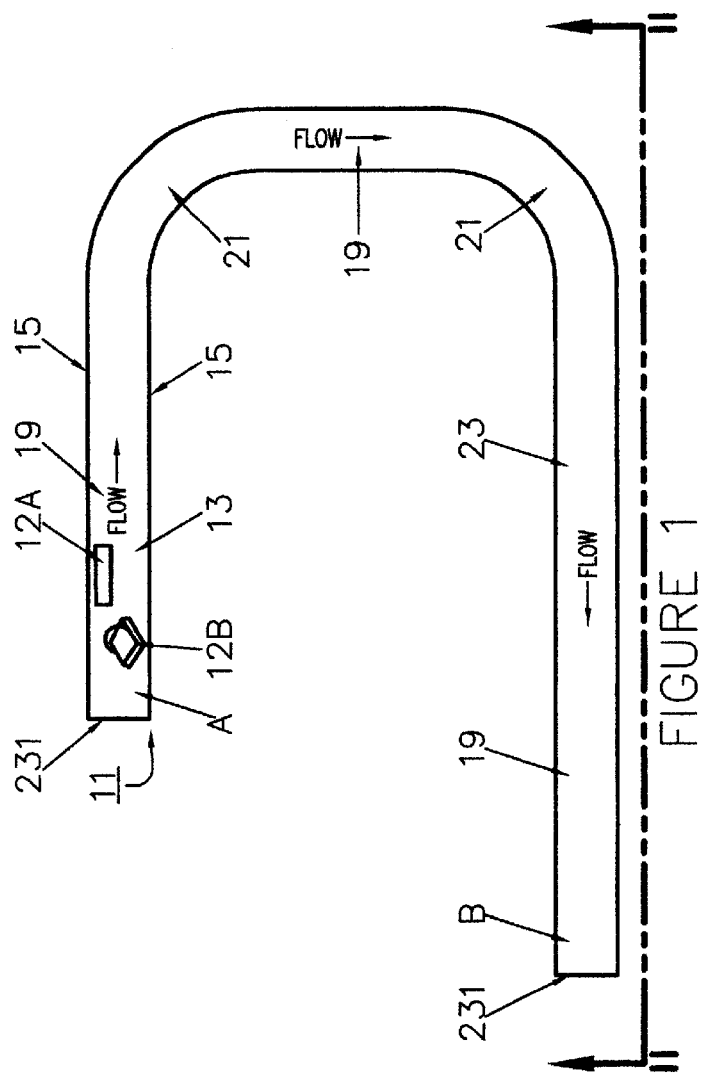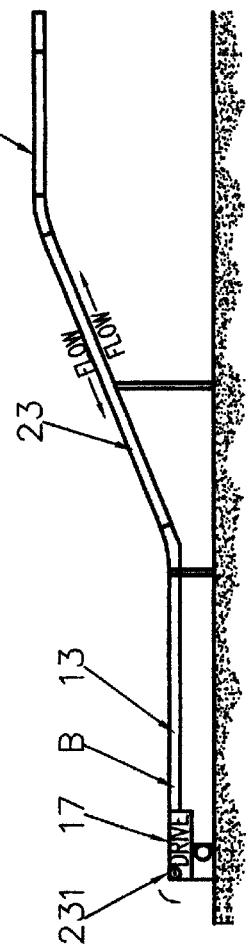

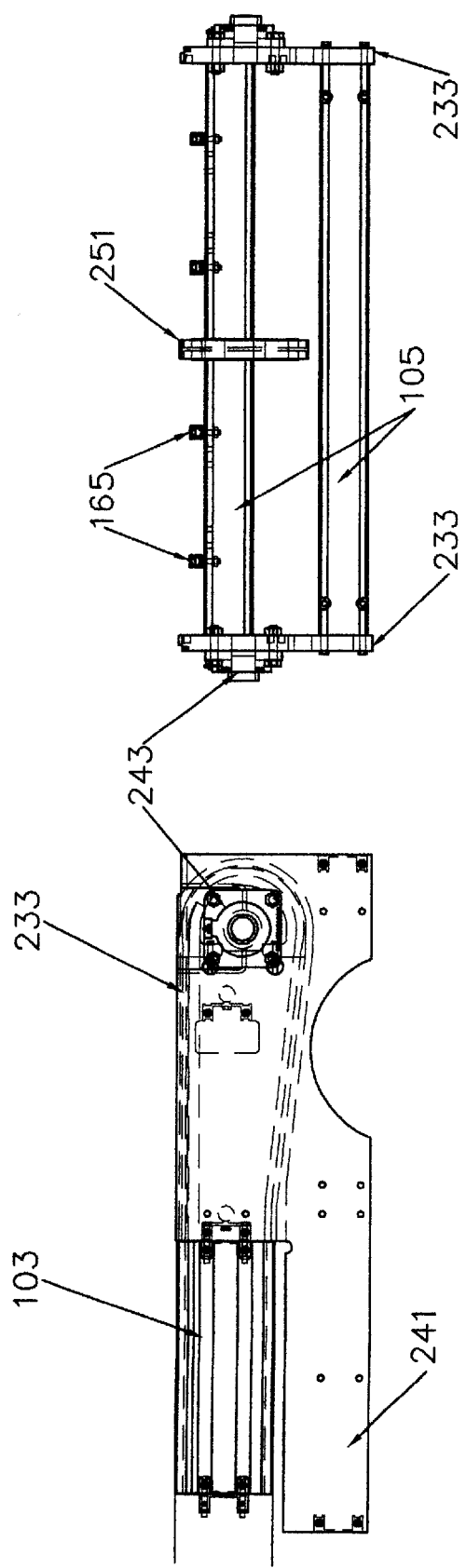

CONVEYOR BELT SYSTEM

The present application is a continuation application of U.S. Ser. No. 09/525,775, filed Mar. 14, 2000 now U.S. Pat. No. 6,471,048, which in turn claims the benefit of U.S. provisional application Ser. No. 60/125,600, filed Mar. 19, 1999.

FIELD OF THE INVENTION

The present invention relates to conveyor belts that are used to carry objects or articles from one location to another.

BACKGROUND OF THE INVENTION

Plastic conveyor belts are well known in the art. For example, Palmaer, U.S. Pat. No. 4,742,907 described a plastic conveyor belt.

Designing a conveyor belt to go straight is difficult. Designing a conveyor belt to turn or go up and down an incline is even more difficult.

The conveyor belt of the '907 patent is able to traverse curves. The individual belt links can move closer to or away from adjacent links. This property is useful for traversing curves, wherein at the inside of the curve, the belt links are close together, and at the outside of the curve, the belt links are spread apart. The belt has gaps between the links for traversing curves. The gaps also allow air to circulate through the belt, an advantage when the belt conveys foods.

Adapting the belt to other applications presents some problems. In the package handling and baggage industries, the objects being conveyed are subject to being caught in the gaps between the links. For example, baggage has straps, hooks, wheels, handles, etc. which can become easily captured between two links. Packages may be flimsy envelopes, which can also become caught. A bag or package that becomes caught by the conveyor belt risks damage to itself and to the conveyor belt.

Another problem is speed. Packages and baggage are most desirably conveyed at high speeds, such as 300 feet per minute. This is in contrast with the much lower speed of the food handling industry (for example, 50 feet per minute). Higher speeds produce greater forces exerted on the belt. In addition, the links produce a loud and undesirable chatter at high speeds.

The loading on conveyor belts used in the package industry is much greater than those encountered in the food industry. The loading in the food handling industry is 10–13 pounds per linear foot, while it is 50 pounds per linear foot in the package industry (for a 36" wide belt).

SUMMARY OF THE INVENTION

It is an object of the present invention to provide a conveyor belt that can be used in the baggage or package industry without the problems discussed above.

The present invention provides a link for a plastic conveyor belt. The belt is constructed of links interconnected by pivot rods in a sequence of hinged links for conveying articles along a path, which path may include a curved portion. The link includes a rib, a first set of projections and a second set of projections. The first set of projections extends from the rib in a first direction. The individual projections of the first set are separated from each other by respective first gaps. The projections of the first set each have an opening therethrough. The openings in the first set of projections are aligned so as to receive a first pintle. The second set of projections extends from the rib in a direction that is opposite of the first direction. The individual projections of the second set are separated from each other by respective second gaps. The projections of the second set are staggered with respect to the projections of the first set. The projections of the second set each having a slotted opening therethrough. Each of the slotted openings extend for a portion of the length of the respective projection of the second set. The openings in the second set of projections are aligned so as to receive a second pintle. The rib, the first set of projections and the second set of projections collectively have a first side and a second side. The projections of the first and second sets each have a length. A cover member is located on the first side. The cover member overlies a portion of the lengths of the projections of the first and seconds sets so as partially cover the first and second gaps.

In accordance with one aspect of the present invention, the rib has ends, with the first set of projections having first endmost projections located at the ends of the rib and the second set of projections having second endmost projections located at the ends of the rib. The cover members couple to the first and second endmost projections.

In accordance with another aspect of the present invention, the cover member extends from the rib along the lengths of the projections of the first and second sets a distance that is:

$$\text{distance} \geq \text{length of the projections of respective set} - (A+B+C)$$

where A=the distance between the end of a projection in the first set and the opening in the projection B=the distance between the end of a projection in the second set and the opening in the projection C=the diameter of the pivot rod.

In accordance with still another aspect of the present invention, the link has a stepped first side, with a step being formed between the first set of projections and the cover member and another step being formed between the second set of projections and the cover member.

In accordance with still another aspect of the present invention, the cover member has a carrying surface facing away from the rib. The carrying surface has a groove therein.

In accordance with still another aspect of the present invention, the link has two ends with the cover member extending between the ends. The cover member has beveled portions at each of the ends to accommodate the curved path.

In accordance with another aspect of the present invention, the link has two ends, with each end having a slot therein. The slot is parallel to the first and second sets of projections. The slot being structured and arranged to receive a guide rail.

In accordance with still another aspect of the invention, the slot has an inside surface that is structured and arranged to contact the guide rail. The inside surface is arcuate so as to be convex.

In still another aspect of the present invention, each of the link ends has outside end surfaces with the slot in each end being between the outside end surfaces. The outside end surfaces are each arcuate so as to be convex.

The present invention also provides a link for a plastic conveyor belt, the belt being constructed of links interconnected by pivot rods into a sequence of hinged links for conveying articles along a path which path may include a curved path. The link includes a rib, a first set of projections and a second set of projections. The first set of projections extends from the rib in a first direction. The individual projections of the first set are separated from each other by respective first gaps. The projections of the first set each having an opening therethrough. The openings in the first set of projections being aligned so as to receive a first pivot rod. The second set of projections extends from the rib in a direction that is opposite of the first direction. The individual projections of the second set are separated from each other by respective second gaps. The projections of the second set are staggered with respect to the projections of the first set. The projections of the second set each have a slotted opening therethrough. Each of the slotted openings extends for a portion of the length of the respective projection of the second set. The openings in the second set of projections being aligned so as to receive a second pivot rod. The link has two ends, with the rib extending between the ends. A slot is formed in each end of the link. Each slot is formed by a pair of walls extending from an endmost projection in either the first or second sets of projections. The endmost projections are at respective ends of the rib.

In accordance with another aspect of the invention, each of the slots has an inside surface that is structured and arranged to contact a guide rail. The inside surface is arcuate so as to be convex.

In accordance with still another aspect of the present invention, each of the walls that extend from the endmost projection to form the slot has an outside end surface. The outside end surfaces are arcuate so as to be convex.

The present invention also provides a conveyor belt system for carrying articles along a path which path may include a curved path. First and second conveyor belts are located side by side adjacent to each other. The first and second conveyor belts are guided along respective paths by tracks. Each of the first and second conveyor belts includes a plurality of links, with each of the links comprising a rib, a first set of projections and a second set of projections. The first set of projections extends from the rib in a first direction. The individual projections of the first set being separated from each other by respective first gaps. The projections of the first set each having an opening therethrough. The openings of the first set of projections are aligned so as to receive a first pivot rod. The second set of projections extends from the rib in a direction that is opposite of the first direction. The individual projections of the second set are separated from each other by respective second gaps. The projections of the second set are staggered with respect to the projections of the first set. The projections of the second set each having a slotted opening therethrough. Each of the slotted openings extends for a portion of the link of the respective projection of the second set. The openings of the second set of projections being aligned so as to receive a second pivot rod. The link has two ends with the rib extending between the ends. A slot is formed in each of the link. Each slot is formed by a pair of walls extending from an endmost projection in either the first or second sets of projections. The endmost projections being at the respective ends of the rib. The end slots receive the tracks, there being a center guide serving as a center track between the first and second conveyor belts. The center guide has first and second lips extending in opposite directions from each other. The first and second lips are coupled to mounting structure by a web. The first and second lips are received in end slots of the links in the first and second conveyor belts.

In accordance with another aspect of the present invention, the first and second lips comprise metal with plastic being interposed between the first and second lips on the conveyor belt links.

The present invention also provides a conveyor belt system for carrying articles along a path. There is a plurality of plastic links, with each link having a rib, a first set of projections and a second set of projections. The first set of projections extends from the rib in a first direction. The individual projections of the first set being separated from each other by respective first gaps. The projections of the first set each having an opening therethrough. The openings of the first set of projections are aligned so as to receive a first pivot rod. The second set of projections extends from the rib in a direction that is opposite of the first direction. The individual projections of the second set are separated from each other by respective second gaps. The projections of the second set are staggered with respect to the projections of the first set. The projections of the second set each having a slotted opening therethrough. The slotted opening extends for a portion of the length of the projection of the second set. The openings of the second set of projections being aligned so as to receive a second pivot rod. The links being coupled together with the pivot rods such that the first set of projections are received by the second gaps and the second set of projections are received by the first gaps. Each of the links having two ends with each of the ends having a slot therein. The slot is parallel to the first and second sets of projections. There are two side frames that are spaced apart from each other. Each side frame has first and second lips. The first and second lips extend in an inside direction and are separated from each other by one or more cross members that couple the side frames together. The conveyor belt has an upper portion and a lower portion, with the slots of the belt links in the upper portion of the conveyor belt receiving the first lips and the slots of the belt links in the lower portion of the conveyor belt receiving the second lips.

The side frames and cross members form a self-contained support assembly for the conveyor belt.

In accordance with another aspect of the present invention, the side frames have outside surfaces which outside surfaces engage vertical supports.

DESCRIPTION OF THE DRAWINGS

FIG. 1 is a schematic plan view of a conveyor belt system, incorporating the conveyor belt of the present invention, in accordance a preferred embodiment.

FIG. 2 is a schematic elevational view of the conveyor belt system, taken at lines II—II of FIG. 1.

FIG. 25 is a side elevational view of the turnaround subassembly of FIG. 24.

FIG. 26 is an end view of the turnaround subassembly of FIG. 24.

DESCRIPTION OF THE PREFERRED EMBODIMENT

Figure 3:
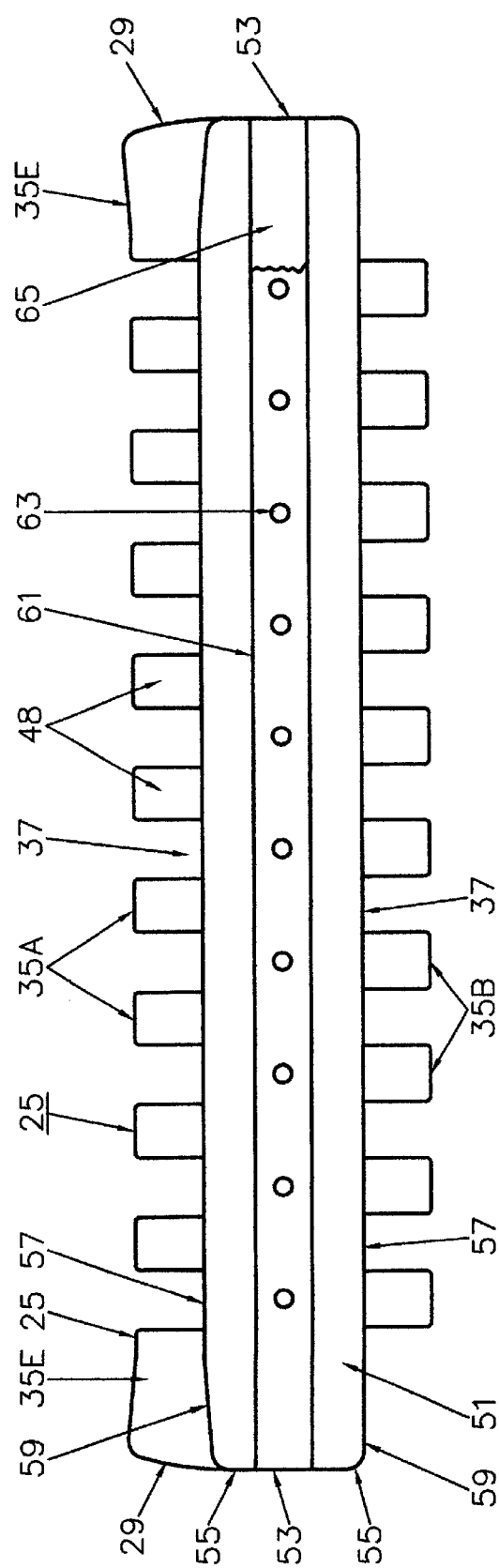
FIG. 3 is a top plan view of a link of the conveyor belt.

In FIGS. 1 and 2, there is shown a conveyor belt system 11. The system is used to convey objects, such as packages 12A or baggage 12B, from one location to another. The system 11 has a conveyor belt 13, guides or tracks 15, and a drive mechanism 17.

The conveyor belt 13 can have straight sections 19, radiused or curved sections 21 and inclined or declined sections 23. Straight sections 19 involve the belt traveling in a uniform direction. Radiused sections 21 involve the belt turning from one direction to another. Inclined or declined sections 23 involve a change in elevation of the belt.

The guides 15 control the path of the belt. The guides 15 include side (or end) guides and bearing (or intermediate) guides. The guides 15 contact the belt to steer and support the belt. The guides will be described in more detail below.

The conveyor belt 13 is endless and thus travels in a continuous loop. In the system 11 shown in FIGS. 1 and 2, there are returns or turnarounds 231 at locations A and B of the system. At location B, the top belt portion rounds the return to go underneath. At location A, the underneath belt portion rounds the return to go on top. The top belt travels from location A to location B, while the bottom belt travels from location B to location A.

The drive mechanism 17 includes a motor driven sprocket that engages the conveyor belt. The speed of belt travel can vary between 10–300 linear feet per minute. The drive mechanism 17 can move the conveyor belt in either direction.

Figure 5:
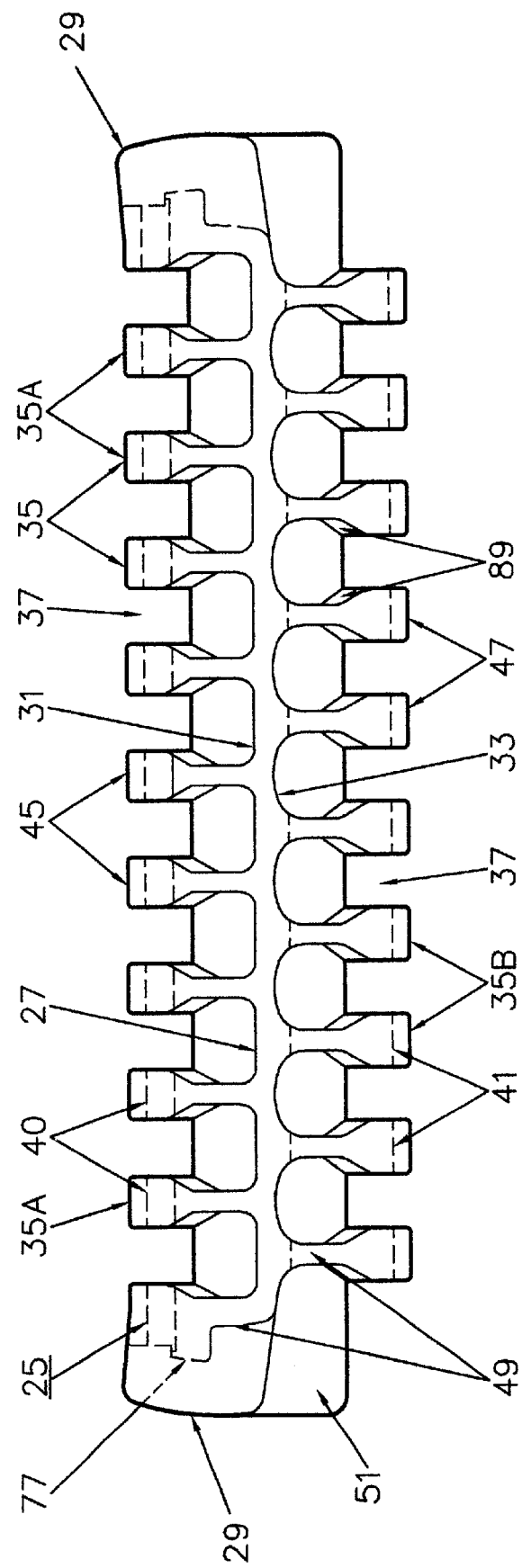
FIG. 5 is a bottom plan view of the links of FIGS. 3 and 4.
Figure 7:
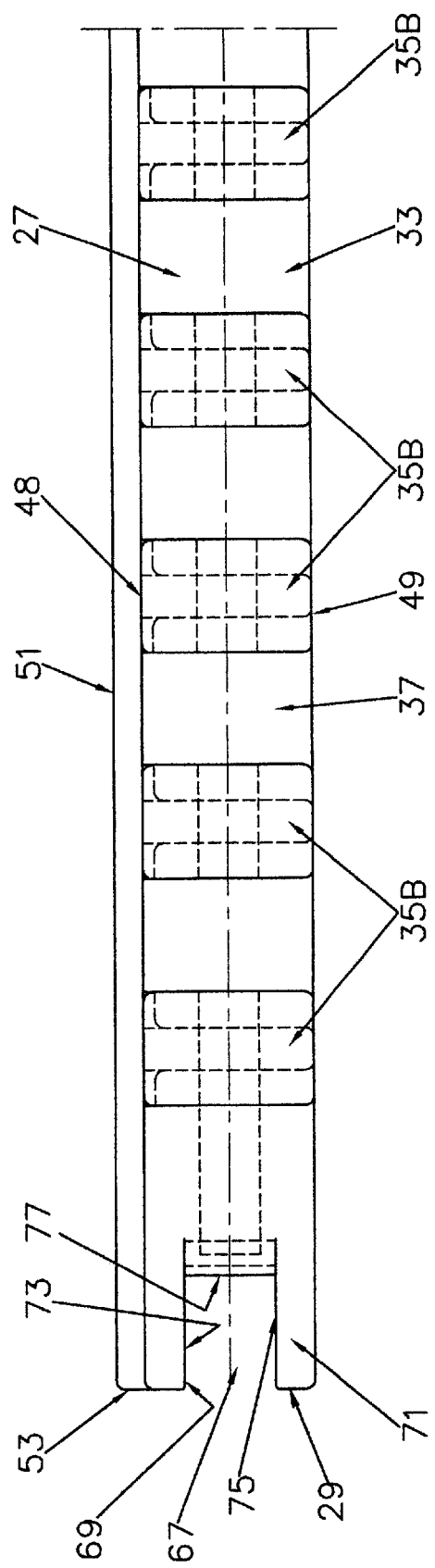
FIG. 7 is a detailed side view of the link of FIG. 6.

The conveyor belt 13 is made up of a plurality of links 25 or modules that are coupled together. Referring to FIGS. 3, 5 and 7, each link 25 has a central, straight rib 27 that extends between the ends 29 of the link. (In the preferred embodiment, the ends 29 have a slot 67 therein; therefore, the rib 27 does not extend all the way to the ends 29.) The rib 27 has a forward or leading side 31 and a rearward or trailing side 33. Projections 35 extend out from the rib 27. Adjacent projections 35 are separated from each other by a gap 37. Each projection has a free end 39.

There is a first set of projections 35A that extends transversely from the leading side 31 of the rib 27. A second set of projections 35B extends transversely from the trailing side 33 of the rib 27. (In the description that follows, "leading" and "trailing" are used to provide a frame of reference to describe the links. However, the links can be driven in either direction.)

Figure 12:
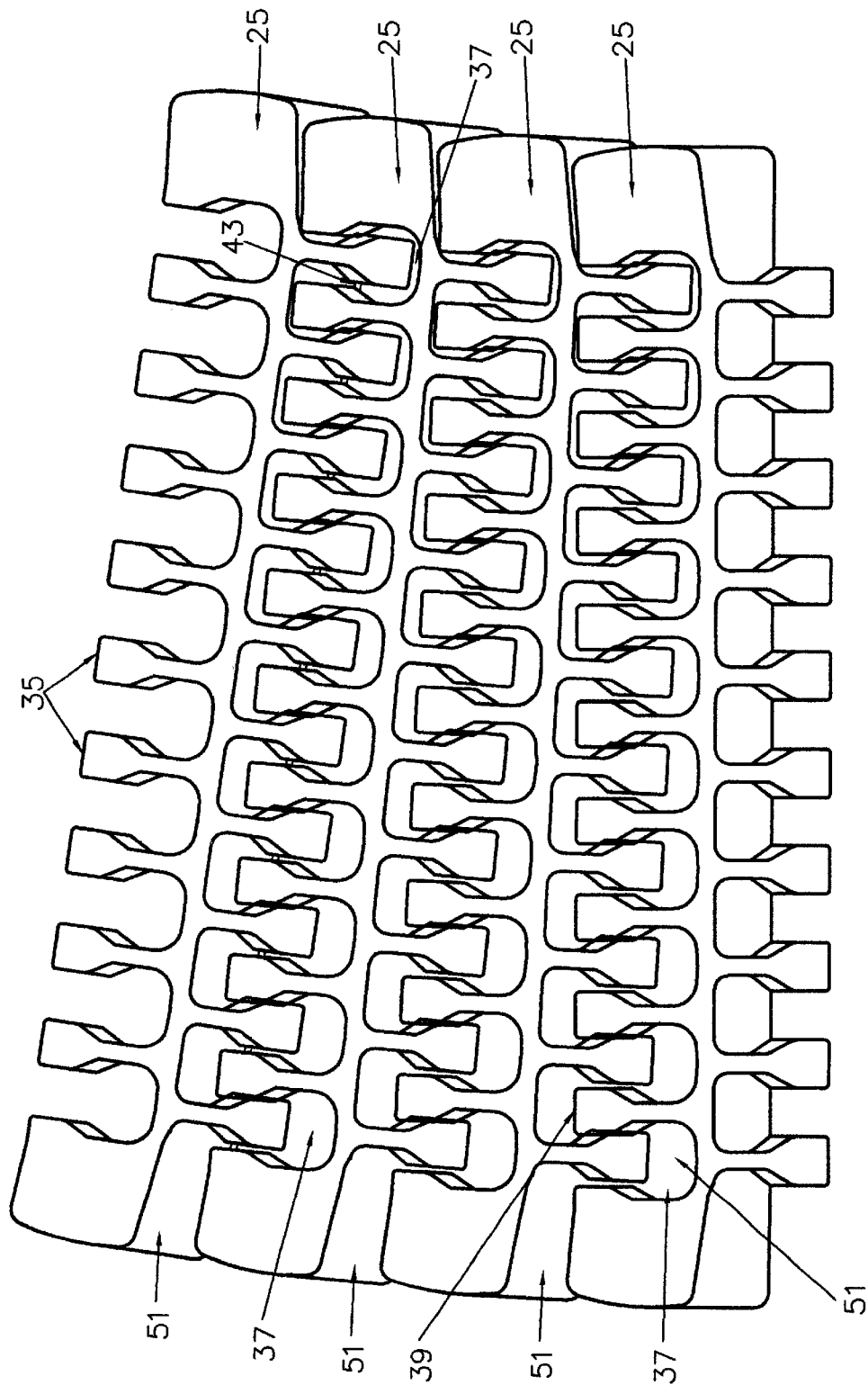
FIG. 12 is a bottom plan view of the conveyor belt portion of FIG. 11.

The second set of projections 35B are offset or staggered from the first set of projections 35A. Thus, the projections of one set are centered with the gaps 37 of the other set. This offset allows the projections of one link to fit interdigitally with the projections of the adjacent link, as shown in FIG. 12 while the ends 39 remain aligned. (In FIG. 12, the ends 39 are aligned along an arc or curve; when the links 25 are on a straight section 19, the ends 39 are aligned along a straight line.)

Figure 8:
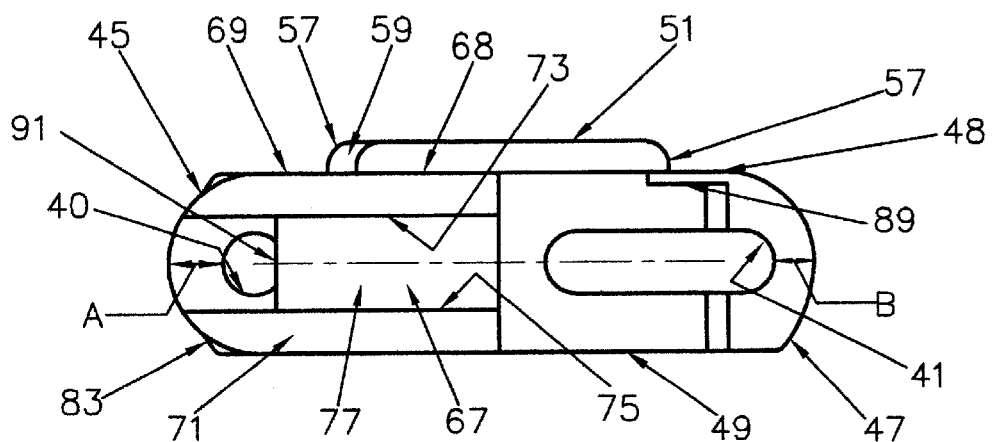
FIG. 8 is an end view of the link taken along lines VIII—VIII of FIG. 6.
Figure 9:
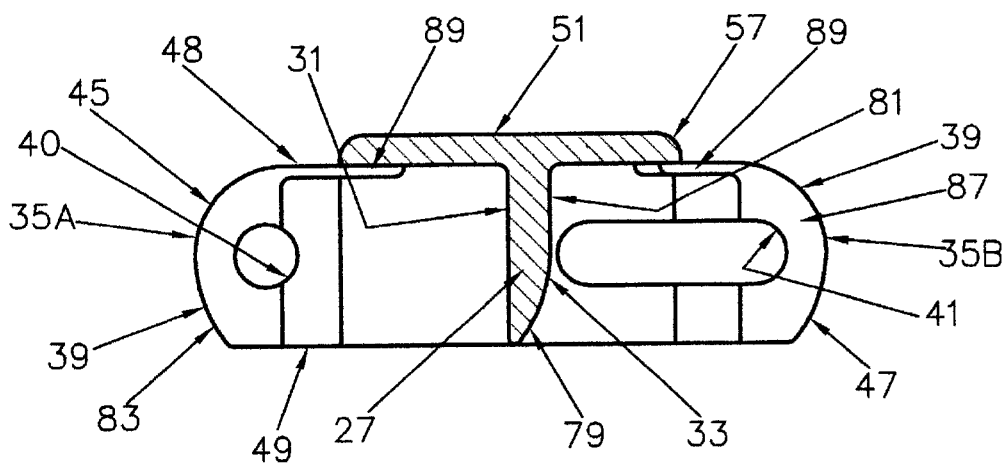
FIG. 9 is a cross-sectional end view of the link, taken through lines IX—IX of FIG. 6.

Each of the projections of the first set 35A has a cylindrical opening 40 therethrough (see FIGS. 8 and 9). Each of the projections of the second set 35B has a slot 41 therethrough. The openings 40 are oriented with respect to each other so as to receive a pintle 43, or pivot pin, that is generally parallel to the rib 27 (see FIG. 12). Likewise, the slots 41 are oriented with respect to each other so as to receive a second pintle 43 that is generally parallel to the rib 27.

The projections 35 are generally coplanar with each other as shown by the end view of FIG. 8. The link 25 has leading and trailing sides that correspond to the ends 39 of the projections 35. The leading side corresponds to the ends 45 (see FIGS. 5 and 8) of the first set 35A of projections, while the trailing side corresponds to the ends 47 of the second set 35B of projections. As shown in FIG. 9 the ends 45, 47 of the projections are rounded.

For purposes of this description, the link also has top and bottom sides 48, 49 (top and bottom are used with reference to FIGS. 7 and 9, and also to the orientation of a link when in the top belt portion of the conveyor belt transversing from location A to location B of FIG. 1). A cover member 51 covers a portion of the top side 48 of each link, while the bottom side 49 is uncovered. Thus, the gaps 37 between the projections 35 are partially covered from the top side 48 by the cover member 51, while being uncovered from the bottom side 49. In the preferred embodiment, the cover member 51 is a plate. The plate 51 extends from the rib 27 toward the ends 45 of the first set 35A of projections. Likewise, the plate 51 extends from the rib 27 toward the ends 47 of the second set 35B of projections. The plate 51 extends to the mid-length of the projections 35, thus leaving the end portions of the projections uncovered. This allows the links 25 to traverse a radiused section, as will be described more fully below. The ends 53 of the plate extend to the ends 29 of the link (see FIG. 6). More specifically, the plate extends a distance from the rib 27 that is:

$$\text{distance} \geq \text{length of the projections} - (A+B+C)$$

where A=the distance between the end of the opening 40 and the end of the projection 35A (see FIG. 8)

B=the distance between the end of the slot 41 and the end of the projection 35B

C the diameter of the pintle 43.

Figure 11:
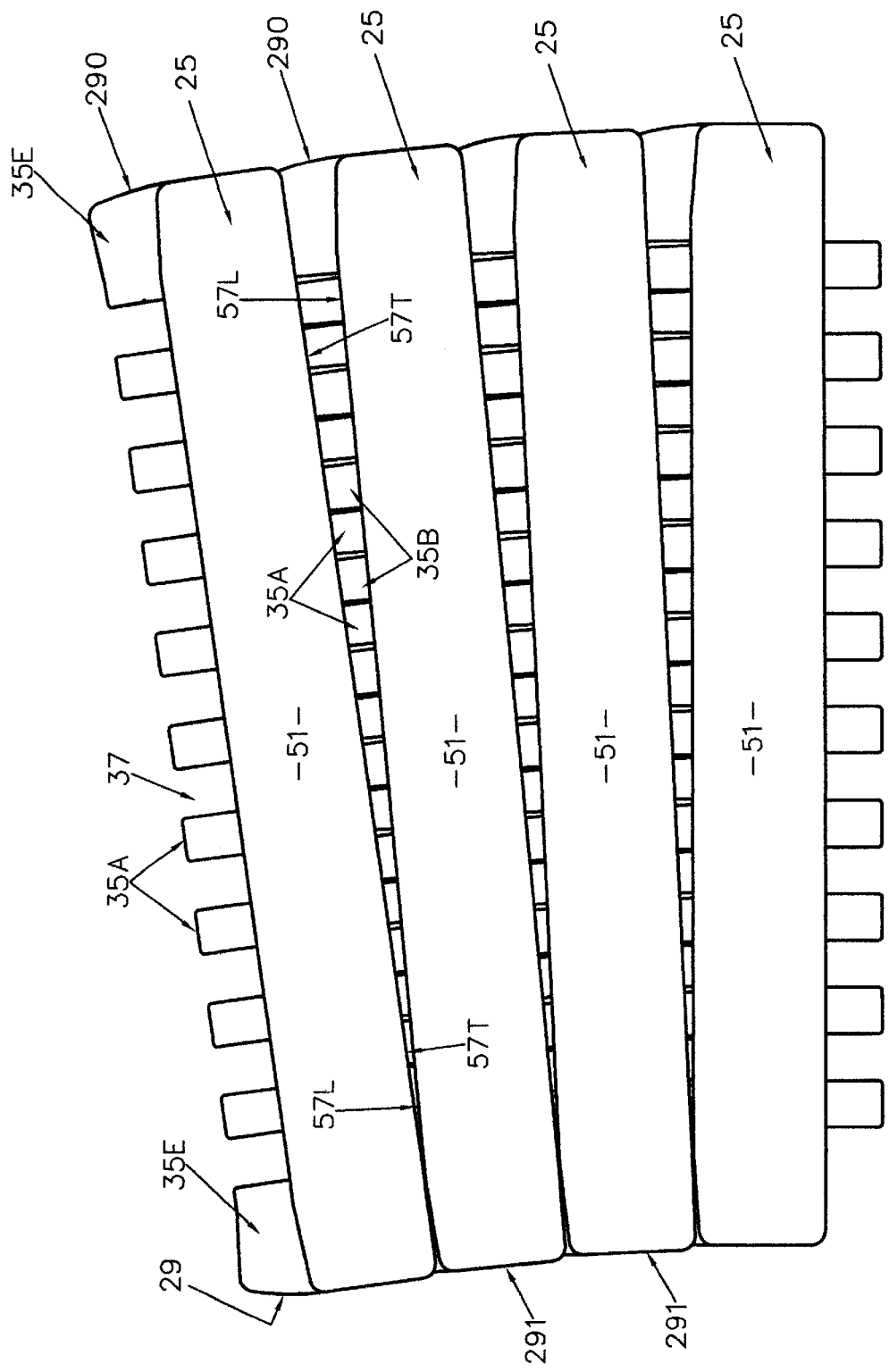
FIG. 11 is a top plan view showing a portion of a conveyor belt configured in a turn.

Thus, the plate 51 of a particular link extends over the ends 39 of the projections of the adjacent and interlocked link. As shown in FIG. 11 (especially on the right side where the links are pulled apart) the gaps 37 between the projections 35 are covered by the plate 51 and filled by the projections from the adjacent link. (Note that FIG. 12 shows the bottom side of the belt. The plate 51 covers the top side, shown in FIG. 11.) As shown in FIG. 9, the ends 39 of the projections are rounded. The rounded ends 39 allow the plate edge 57 to overlap slightly the ends of the projections of the adjacent link. Thus, the distance given above for the plate extension can be slightly greater than the length of the projections (A+B+C).

The corners 55 and the edges 57 (see FIGS. 3, 6, and 8) of the plate 51 are rounded to eliminate any sharp corners and edges that may snag on the articles that are being conveyed. The leading edge of the plate 51 is tapered 59 (see FIGS. 3, 6 and 8) near the corners. This tapering assists the link 25 in traversing a radiused section 21 on the conveyor belt system 11. The trailing edge of the plate 51 can be tapered.

The plate 51 has a groove 61 (see FIG. 3) in its top surface, which groove extends between the plate ends 53. Holes 63 can be formed along the bottom of the groove. The groove is filled with an elastomeric material such as rubber 65. The top surface of the elastomeric material 65 extends above the top surface of the plate 51. The elastomeric material provides friction to prevent objects from sliding on the plates. This is especially useful for inclined sections 23 (see FIGS. 1 and 2) on the conveyor belt system 11. The elastomeric material extends into the holes, which holes serve to retain the elastomeric material in the groove. The holes 63 are optional.

Figure 4:
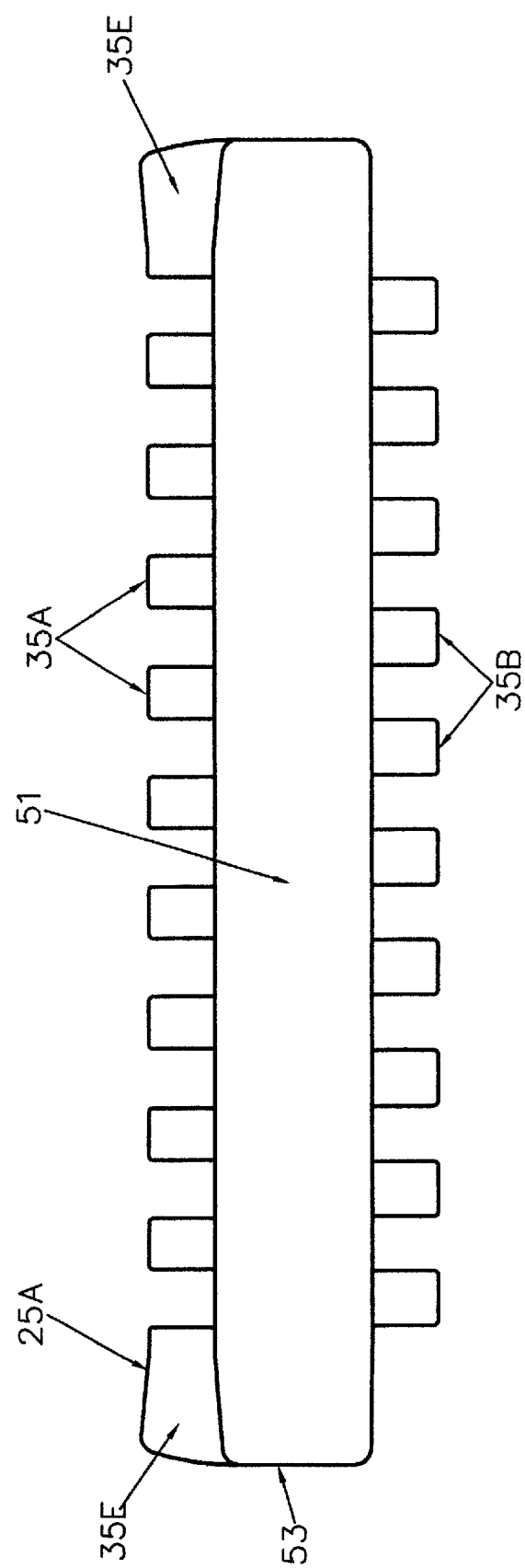
FIG. 4 is a top plan view of a link, in accordance with another embodiment.

As an alternative embodiment, the link can have a plate without a top groove 61 therein (see FIGS. 4 and 11). A belt 13 can have the elastomeric material 65 and groove 61 on every second, third or fourth link.

The length of the projections in the first set is substantially the same as the length of the projections in the second set.

Figure 6:
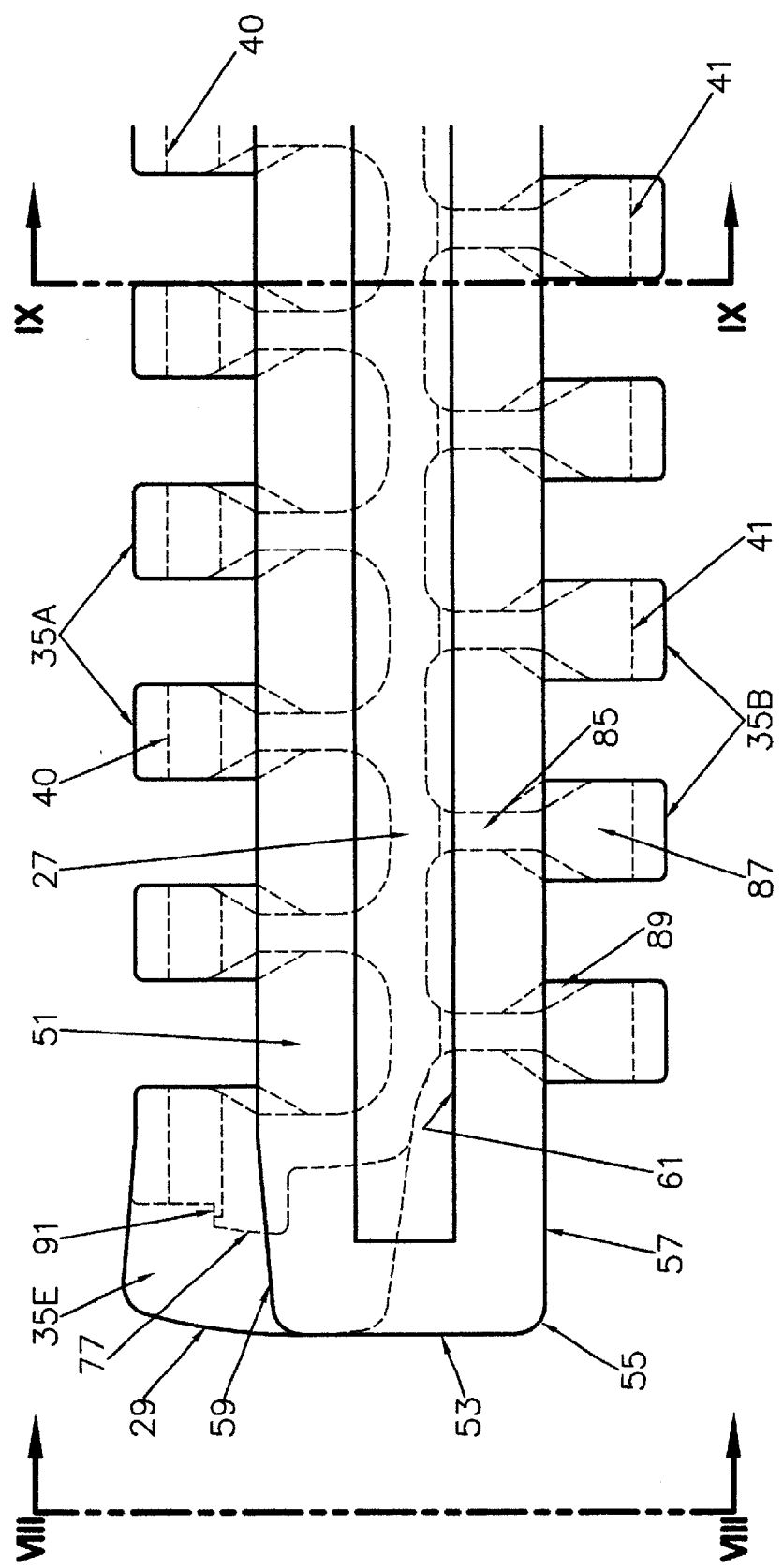
FIG. 6 is a detailed top plan view showing an end of the link of FIG. 4 with hidden lines showing the bottom structure.

Referring to FIG. 6, each projection 35 is made up of a relatively thin web 85 that is coupled to the rib 27 and an enlarged end portion 87 located at the end of the web 85. Thus, the gap 37 between any two projections has a narrow part (between the enlarged end portions 87 of the projections) and a broad part (between the narrow webs 85). This tapered gap configuration assists the links 25 in forming an angle with each other (as shown in FIGS. 11 and 12) in order to traverse a radiused or curved section 21.

Referring to FIGS. 5, 6 and 9, each projection 35 has a lip 89 that extends from the enlarged end portion 87 to the plate. The lip 89 provides for a wider top side 48 of the projection 35 relative to the bottom side 49. Thus, the tapered projections, together with the plate, minimize the exposure of the gaps when the conveyor belt is viewed from the top side (see FIG. 11). By minimizing the exposure of the gaps, the likelihood that an article (such as a package or baggage) will be caught in the belt will be minimized. There are some small spaces between the projections, as illustrated in FIG. 11. This is to allow for ease in moving the one link with respect to an adjacent link.

At each end of the rib 27 is an endmost projection 35E (see FIG. 3). The endmost projections 35E are wider than the other projections 35 due to the provision of a slot 67. The ends 29 of the link 25 are located on the endmost projections 35E. The ends 29 are curved or radiused in a convex arrangement (see FIGS. 3, 5 and 6), wherein the center of the respective end 29 bulges outwardly more than the corners of the end. This outward curvature on the link ends enables the link to better traverse a radiused section 21 (see FIG. 1) of the conveyor belt system. The ends 53 of the plate 51 need not be curved and can be flat as shown in FIGS. 3 and 4. Alternatively, the ends 53 of the plate can be curved.

In addition, each of the endmost projections 35E of the link 25 has a slot 67 therein, which slot is open to the end 29 and to the leading and trailing sides 31, 33. The slot 67 extends generally parallel to the projections 35 (see FIGS. 6–8). The slot 67 is formed by upper and lower end portions or walls 69, 71. The slot has top and bottom surfaces 73, 75 which are flat and smooth. The slot 67 engages the guides 15 along the sides of the conveyor belt 13 (see FIG. 1). The slot also has an inside surface 77 which traverses between the top and bottom surfaces. This inside surface 77 is smooth, but is radiused in a convex arrangement so as to bow outward in the middle. The curvature of the inside surface 77 need not be the same as the curvature of the end 29. In the preferred embodiment, the curvature of the inside surface 77 is greater than the curvature of the end 29. The curvature of the inside surface 77 serves to reduce noise, such as chatter, when the links 25 move along the guides or tracks.

Figure 10:
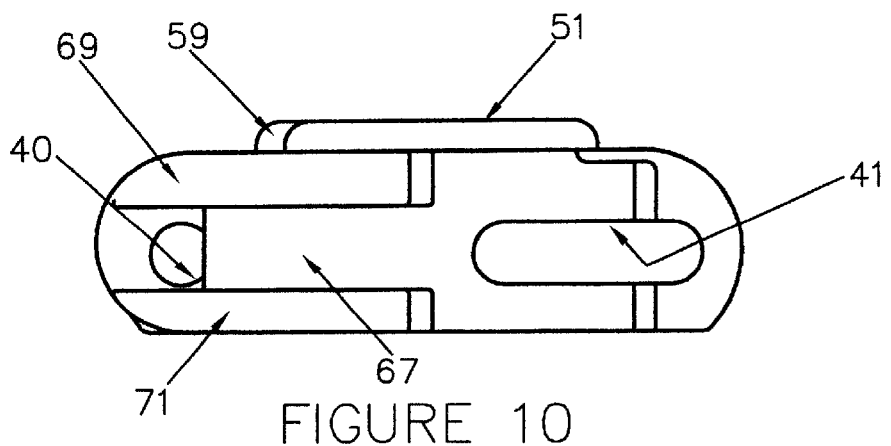
FIG. 10 is an end view of a link, in accordance with still another embodiment.

The upper and lower end portions 69, 71 can be of equal thickness, as shown in FIGS. 7 and 8. The opening 40 is centered within the slot 67. Alternatively, the upper end portion 69 and the lower end portion 71 can be of unequal thickness, as shown in FIG. 10. The upper end portion 69 is of a greater thickness than the lower end portion 71.

Each endmost projection 35E has an opening 40 therethrough, which opening is aligned with the other openings 40 in the projections 35A so as to receive the pintle 43. The opening 40 communicates with the slot 67. At the outermost end of the opening is a shoulder 91 that extends slightly into the opening (see FIGS. 6 and 8). The shoulder 91 serves to retain the pintle in place; the length of the pintle 43 is less than the distance between the shoulders in the endmost projections 35E so that the ends of the pintle are located between the shoulders.

The plate 51 is coupled to the upper end portion 69 of the slot 67 at 68. Thus, the plate 51 serves to strengthen the upper end portion 69 as well as the endmost projection 35E. In fact, the plate provides stiffening all along the length of the link 25. At the outer ends, the trailing portion of the plate overlaps the endmost projection of the adjacent trailing link (see FIG. 12).

The links 25 can be of any length, from end 29 to end 29. The links 25 can be made up of plural components separated along the rib and/or projections, and joined into one length by the pintles 43. For example, a link can be made up of a right end section, a middle section, and a left section or any combination thereof. The links are made of molded plastic; each link has integral projections, rib and plate.

The assembly of the links 25 into a conveyor belt will now be described. The links 25 are all oriented with the plates 51 facing a first direction. The first sets of projections 35A of the links likewise all face a second direction, which is perpendicular to the first direction. Two links are coupled together by inserting the first set 35A of projections of one link into the gaps 37 between the second set 35B of projections of the other link, so that the openings 40 are aligned with the slots 41. The pintle 43 is then inserted from one end 29 of a link, through the openings 40 and slots 41 to the other end and secured in place by the shoulders 91. A number of the links 25 are assembled together to form a continuous conveyor belt 13 loop.

When the links are assembled as shown in FIG. 11, a top or carrying surface is formed. Articles 12A, 12B are loaded on the carrying surface. The carrying surface includes the top surface of the plate 51, as well as the top surfaces of the projections 35A, 35B. The carrying surface is stepped with steps being formed by the plate edges 57T, 57L. The steps provide some contour to the carrying surface so that articles will be carried along with the belt. If the plates are grooved 61, as shown in FIG. 3, the articles are even less likely to slip.

Figure 13:
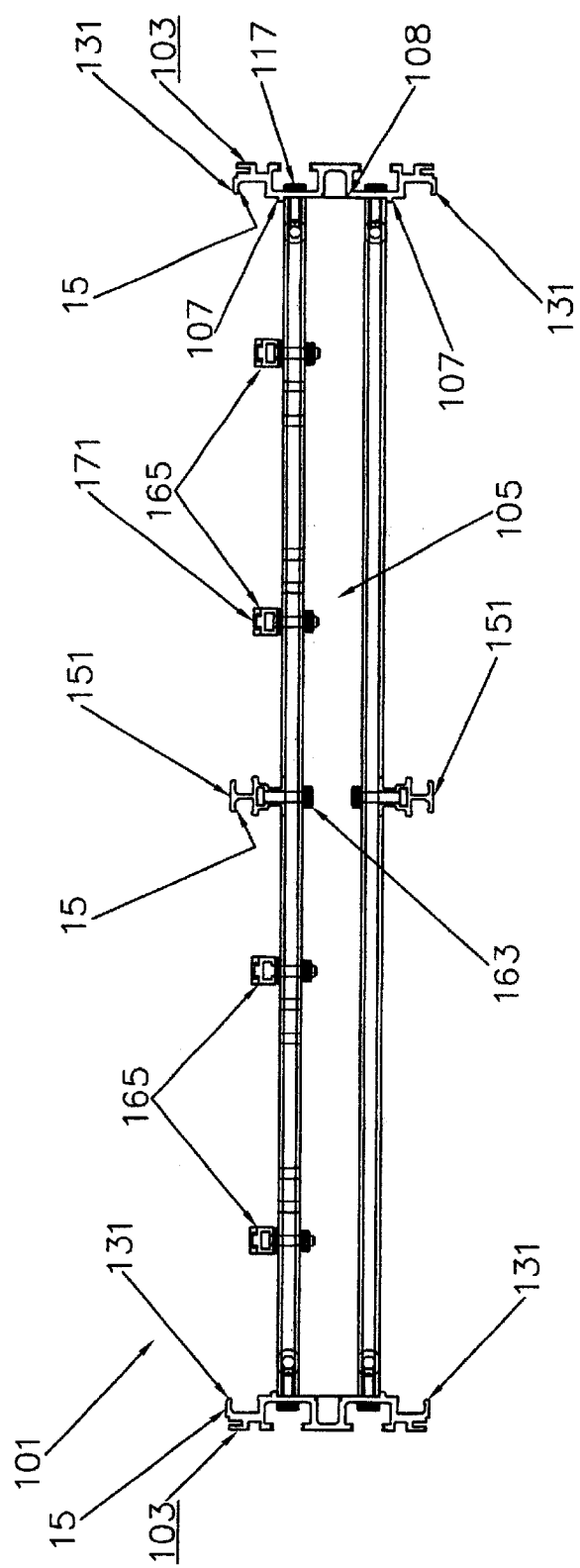
FIG. 13 is a transverse cross-sectional view of the conveyor belt support subassembly, shown configured to receive two side-by-side conveyor belts.
Figure 14:
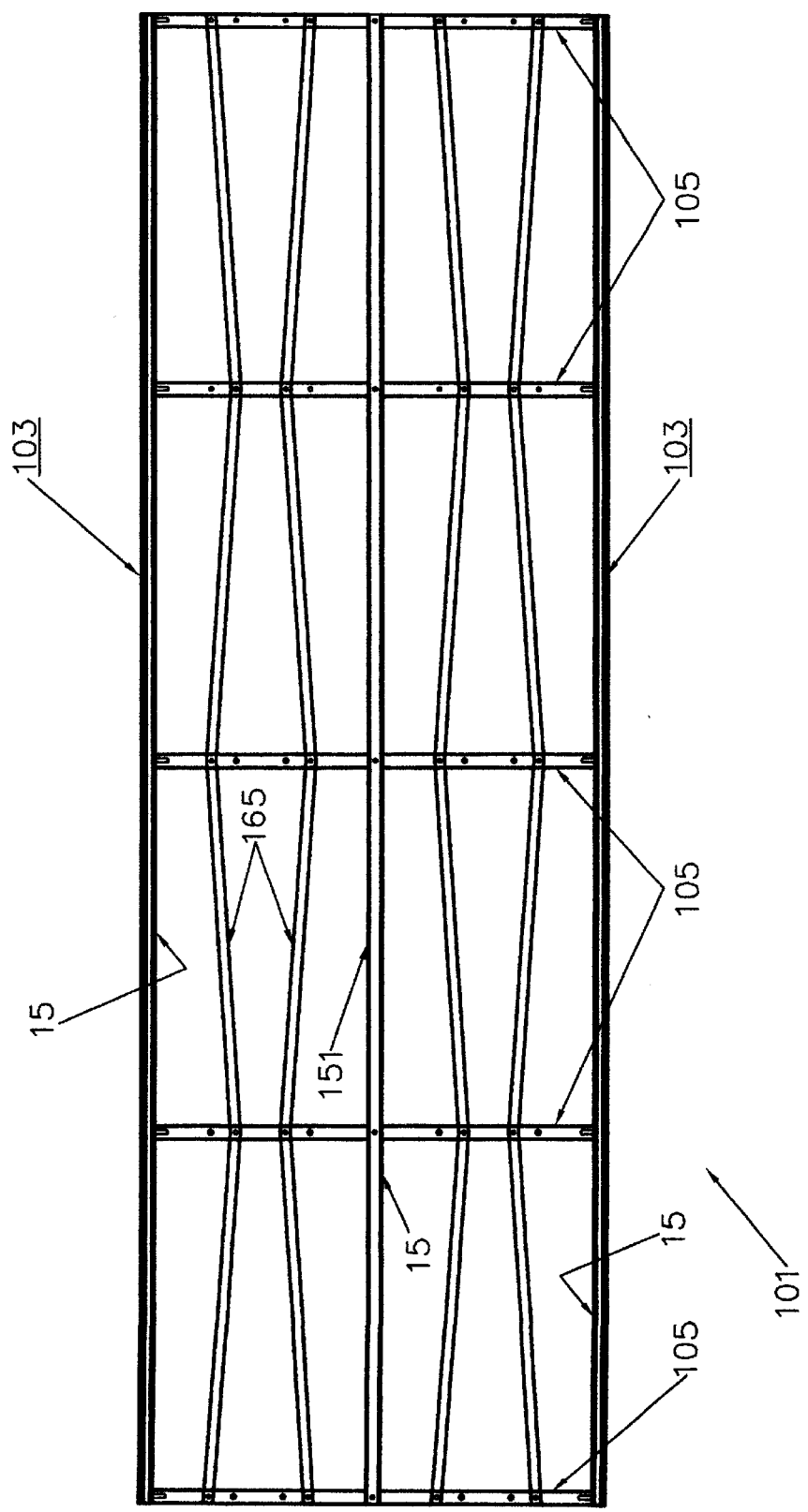
FIG. 14 is a plan view of a portion of the conveyor belt support subassembly of FIG. 13.

The conveyor belt 13 is mounted to a support subsystem 101, shown in FIGS. 13 and 14. The support subsystem 101 supports the conveyor belt up off of the floor and provides the guides 15 or tracks for guiding the conveyor belt along a path.

Figure 15:
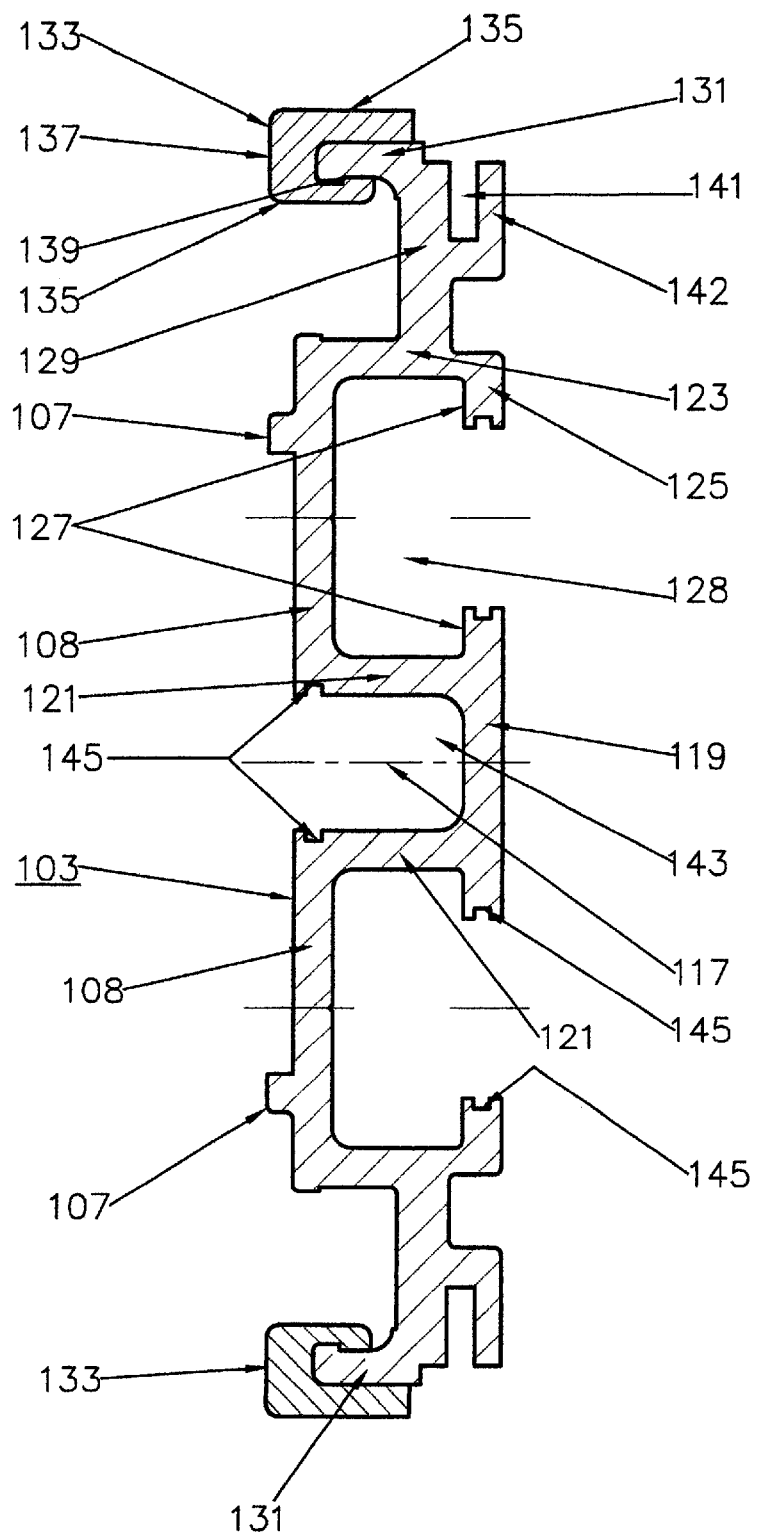
FIG. 15 is a transverse cross-sectional view of a side frame.

In general, the support subsystem 101 forms a rectangular frame. The frame is formed by side frame members 103 and cross members 105. The side frame members 103 extend the length of the support subsystem. There is a side frame member 103 along each side of the support subsystem. The cross members 105 extend transversely across and are coupled to the support frame members 103. As shown in FIG. 15, each side frame member 103 has first and second shoulders 107 that extend from walls 108, which walls are coplanar. The ends of the cross members 105 are received between the shoulders 107, as shown in FIG. 13.

The side frame members 103 and the cross members 105 are made of extruded metal. Thus, the transverse cross-sectional shape remains the same along the length of the members. In addition, the side frame members 103 can be radiused for the curved sections 21 of the system.

Figure 16:
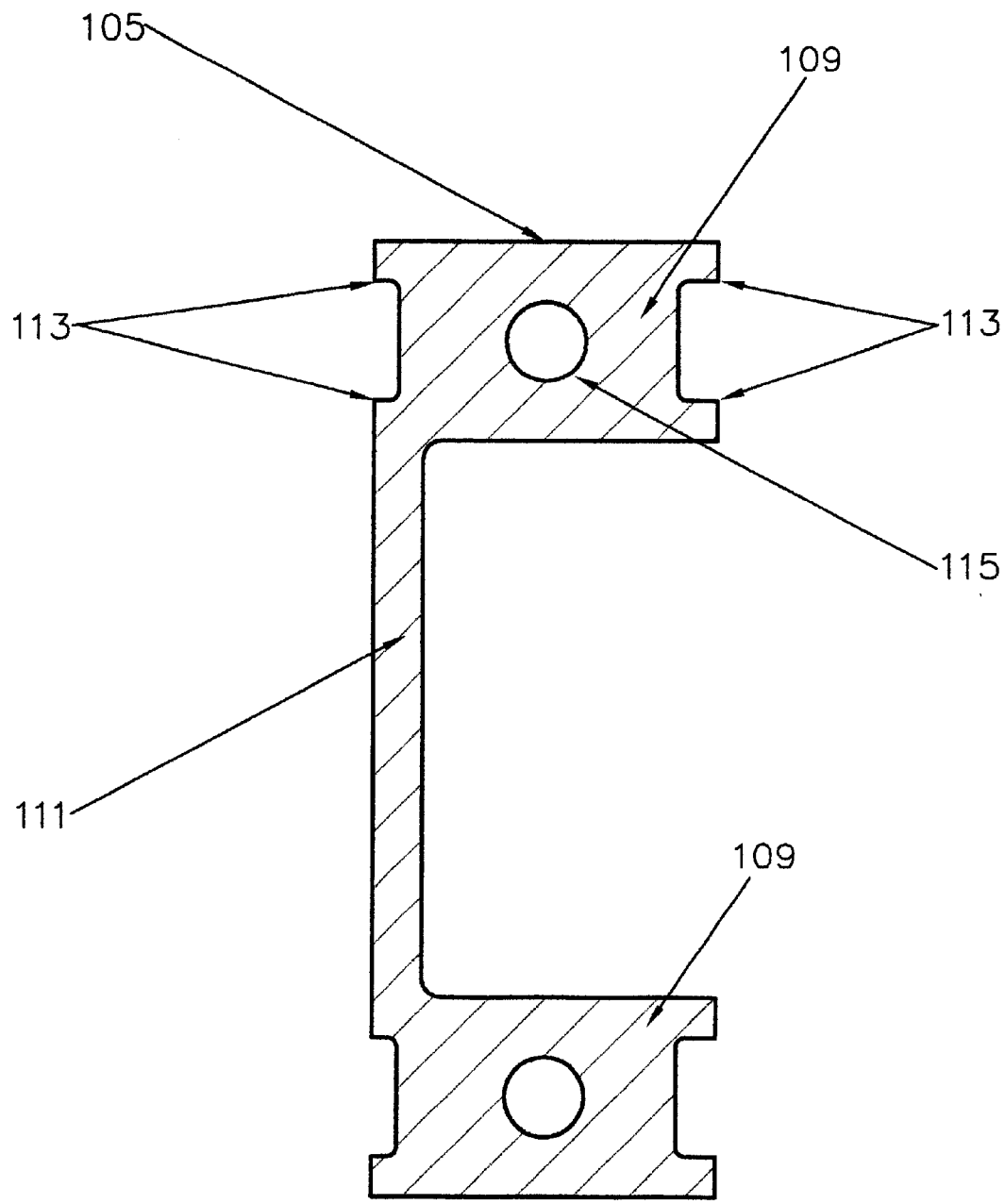
FIG. 16 is a transverse cross-sectional view of a cross member.

Referring to FIG. 16, which shows a cross-sectional view of a cross member 105, the cross member has two rectangular blocks 109 coupled together by a web 111 so as to form a "C". Short flanges 113 extend from the corners of the blocks. Each block has a circular hole 115 therein which hole extends the length of the cross member 105. The ends of the cross member 105 are coupled to the side frame members 103 by threaded fasteners 117 that extend through the walls 108 of the side frame members and are received by the openings 115 of the cross members (see FIG. 13).

Referring to FIG. 15, each side frame member 103 is symmetrical about a center line 117. In describing the cross-section of the side frame member, "inside" and "outside" will be used with reference to the orientation shown in FIGS. 13 and 19, wherein "inside" is towards the conveyor belt and "outside" is away from the conveyor belt. The wall 108 with the shoulder 107 is an inside wall. An outside wall 119 extends transversely from the center line 117 a short distance. A wall 121 that extends parallel to the center line 117 couples the wall 119 to an end of the wall 108. Another wall 123 extends from the other end of the wall 108 in a parallel direction to the wall 121. The two walls 119 and 123 are coplanar. Still another wall 125 extends from the wall 123 toward the wall 119. The walls 119, 121, 108, 123 and 125 form a "C" shaped structure with lips 127. A cavity 128 is formed by the "C" shaped structure. The cavity 128 and the lips 127 are used to couple the side frames to vertical supports 175 (see FIG. 19), which will be described in more detail hereinbelow.

Extending perpendicularly from the wall 123 is another wall 129. A lip 131 extends from the free end of the wall 129 inwardly. A plastic wear strip 133 is placed around the lip 131. The wear strip 133 and the lip 131 serve as tracks for guiding the conveyor belt links 25. The wear strip 133 and the lip 131 are received by the slot 67 in the ends 29 of the links 25. The wear strip 133 has upper and lower surfaces 135 that contact the top and bottom surfaces 73, 75 (see FIGS. 7 and 8) of the slots 67. The distance between the upper and lower surfaces 135 of the wear strip 133 is less than the distance between the top and bottom surfaces 73, 75 so as to provide for a somewhat loose fit. The wear strip has an inside surface 137 that contacts the inside surface 77 (see FIGS. 7 and 8) of each link. The distance between the wear strip inside surfaces 137 is greater than the distance between the two inside surfaces 77 of each link 25 so as to provide for a somewhat loose fit. The links 25 are able to move and/or slide along the lips 131 and wear strips 135. The wear strips are made of a low friction plastic. The wear strips are retained on the lips by corresponding shoulders 139 on each of the lips and shoulders.

With the support subsystem 101, the conveyor belt links 25 are captured and guided at the ends 29 for the entire path that is traversed by the conveyor belt 13. This allows the conveyor belt to be operated at relatively high speeds. In addition, maintenance on the conveyor belt system is minimized because the belt is not subject to misalignment problems.

Returning to the description of the side frame member 103 of FIG. 15, each wall 129 has a channel 141 formed on its outside. The channel 141 is used to couple trim or guard panels 209, 211 (see FIG. 19) to the side frame members 103, which will be described in more detail hereinbelow. The wall 142 forming the channel 141 has an outside surface that is coplanar with the outside surfaces of the walls 119, 125, wherein a leg support 175 can bear against these outside surfaces (see FIG. 19).

As discussed, the side frame member 103 is symmetrical about a center line 117. Thus, there are two lips 131. An upper lip is used to guide the upper portion of the conveyor belt, which upper portion carries the articles 12. A lower lip is used to guide the lower portion of the conveyor belt, which lower portion serves as a return for the continuous loop conveyor belt.

The two walls 121 are separated by a gap 143. Small grooves 145 are formed in the edges of the walls 119, 125 across the gap 128 and of the walls 108 across the gap 143.

Figure 19:
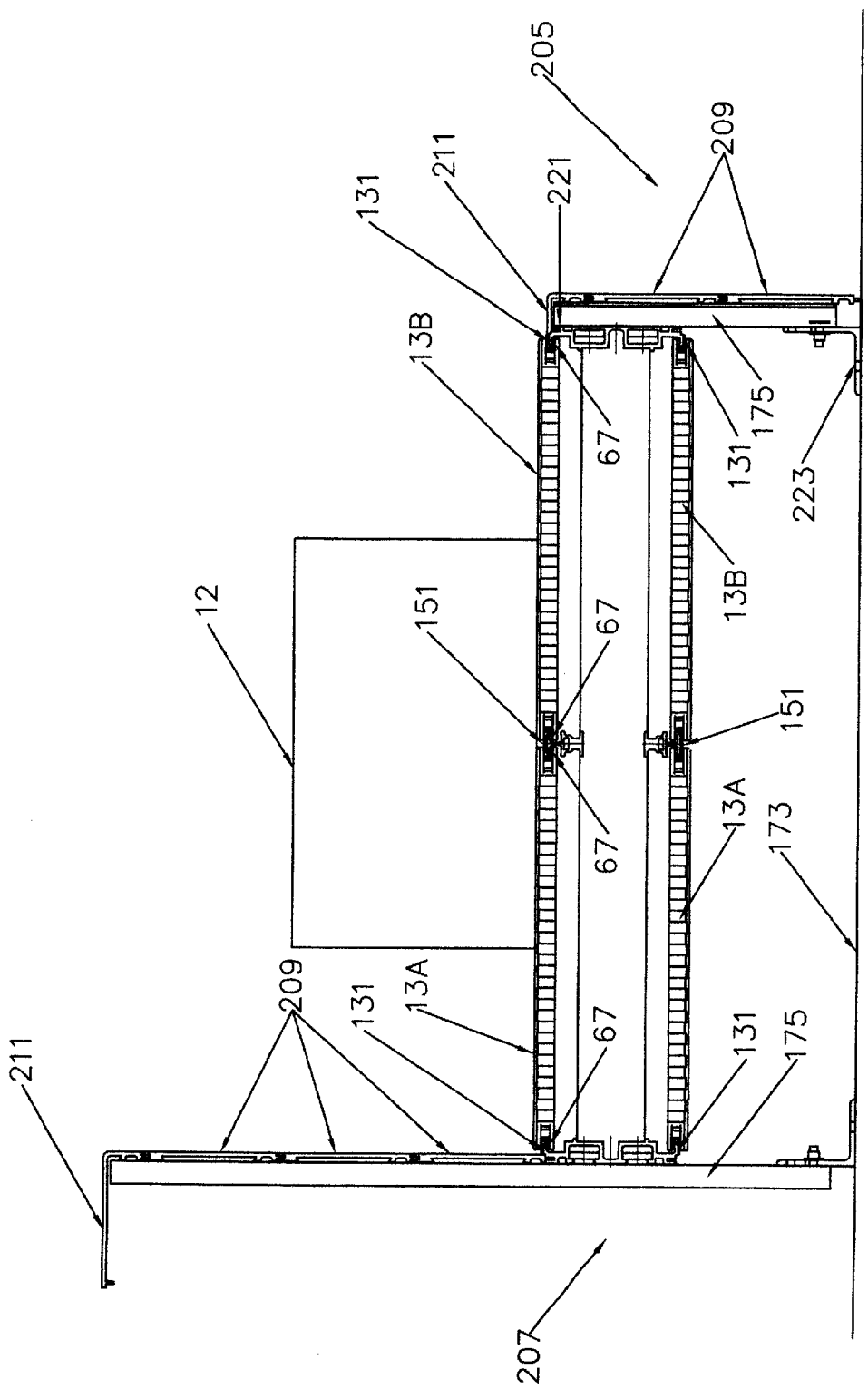
FIG. 19 is a transverse cross-sectional view of two side-by-side conveyor belts and a full support system.

FIGS. 13 and 19 illustrate a support subsystem that supports two conveyor belts 13A, 13B. The two conveyor belts traverse parallel paths and are located adjacent to each other. The use of two side-by-side conveyor belts 13A, 13B allows the construction and operation of a wider conveyor system. The two belts are moved at the same speed, thus forming in essence a single conveyor.

The invention locates the guides below the top surface of the conveyor belts so that articles 12 which are being conveyed can bear on the two belts simultaneously (see FIG. 19). In addition, the conveyor system is able to convey the articles in a curved path 21 (see FIG. 1). Using two (or more) conveyor belts side-by-side allows the length (between the ends 29) of the individual links 25 to remain relatively short. Using relatively short links 25 permits the minimizing of forces on the links 25 and pintles 43 when the belt traverses a curved section 21.

Figure 17:
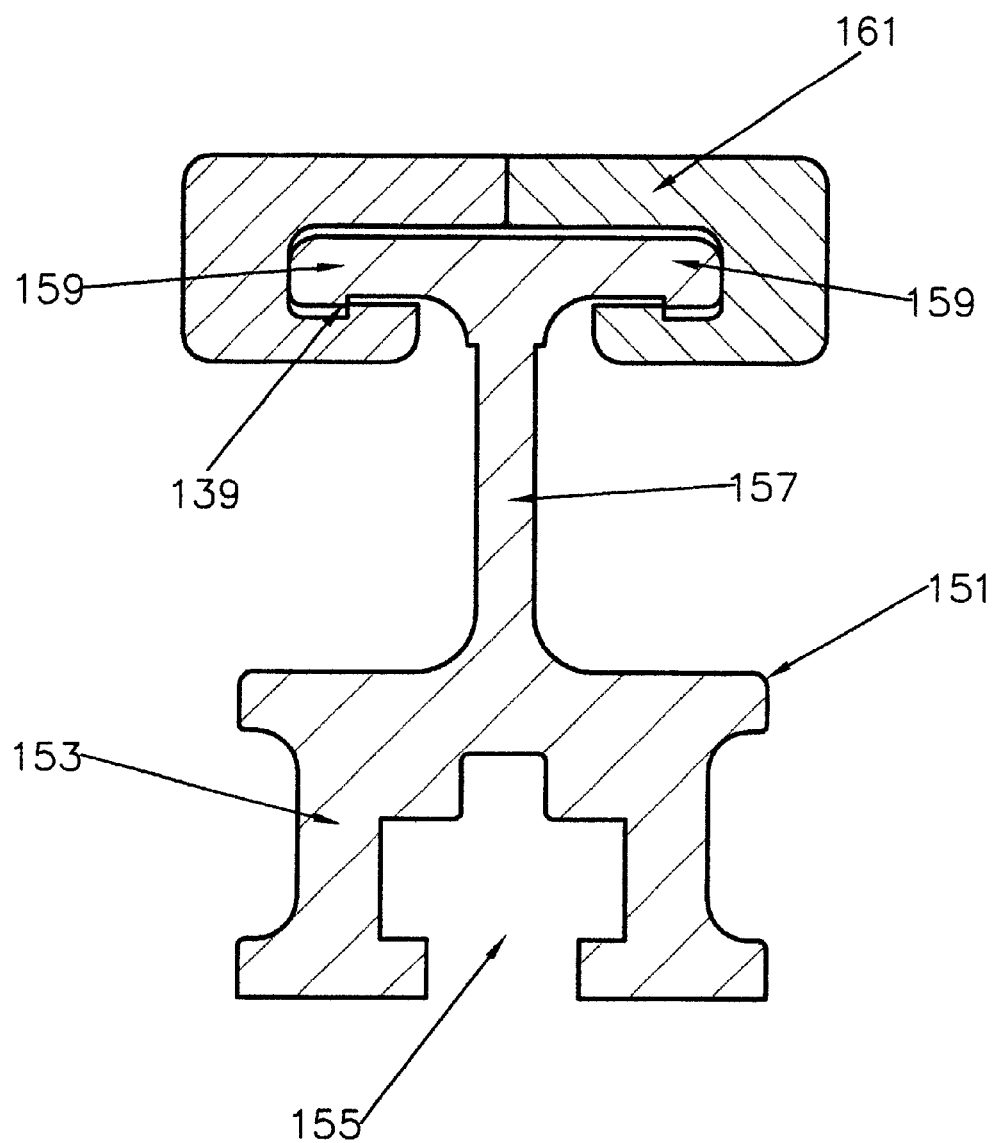
FIG. 17 is a transverse cross-sectional view of a center guide.

Although the conveyor belts in FIG. 19 are described as being side-by-side, the individual links 25 are end 29 to end 29. That is to say that an end 29 of a link 25 in one conveyor belt is adjacent to an end 29 of a link in the other conveyor belt. The two ends 29 of the links in the two conveyor belts are guided by a center guide 151, shown in FIGS. 13, 14, 17 and 19. The center guide 151 forms a rail or track that extends the length of the support subsystem 101. Referring to FIG. 17, the guide has a block 153 with a cavity 155 therein. Extending from the block is a "T" shaped wall structure, having a web 157 and two lips 159 extending in opposite directions from each other. A wear strip 161 is located around the lips 159. Shoulders 139 retain the wear strip 161 on the lips 159.

The center guide 151 is coupled to the cross members 105 by bolts 163. The bolts extend through openings in the respective block 109 of the cross member 105. The bolt heads are located in the cavity, while the nuts are located on the opposite side of the block 109 and are used to secure the bolts. The nuts can be loosened to allow the center guide 151 to be slid into position, after which the nuts are tightened.

Figure 18:
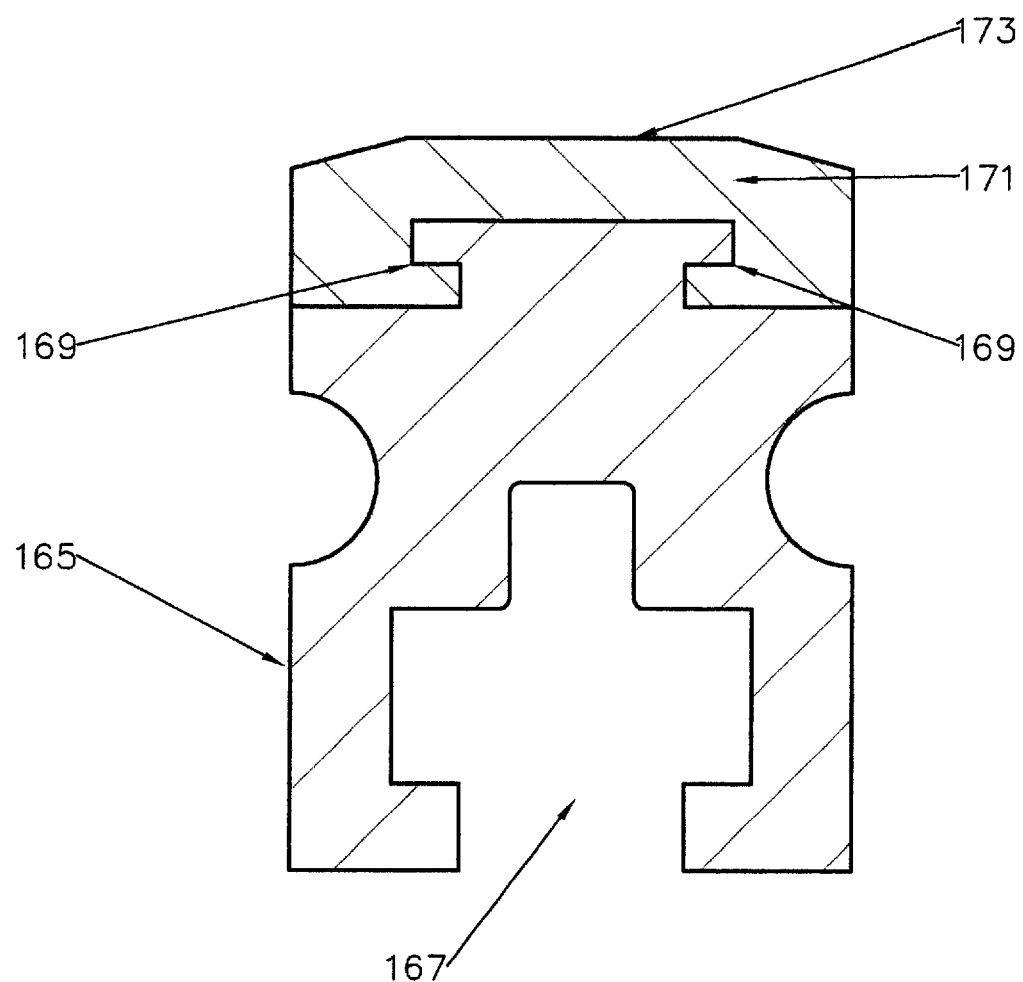
FIG. 18 is a transverse cross-sectional view of an intermediate guide.

There is an upper center guide 151 and a lower center guide 151, as shown in FIG. 13, for the upper and lower portions of the belt. The upper portion of the belts convey articles 12 and consequently bear the weight of the articles. Intermediate guides 165 are positioned beneath the belts to provide support (see FIG. 13; FIG. 19 does not show intermediate guides in order to prevent the drawing from becoming too cluttered.) Referring to FIG. 18, each intermediate guide 165 is generally block shaped in transverse cross-section. There is a cavity 167 for receiving bolt heads, like the cavity 155 of the center guide 151. Two oppositely facing lips 169 serve to receive and retain a wear strip 171. The upper surface 173 of the wear strip is radiused and contacts the bottom side 49 of the links 25.

As shown in FIGS. 13 and 14, the intermediate guides 165 are coupled to the cross members 105 by bolts and nuts, in a similar manner as described with respect to the center guide 151. Also, as shown in FIG. 14, the intermediate guides 165 are preferably installed in a nonparallel configuration. Installing the intermediate guides 165 so as to be parallel to each other and to the center guide 151 is acceptable. However, this may result in wear to the underside of the links 25. To minimize wear on the links, the intermediate guides 165 are installed in a nonparallel arrangement, wherein the distance between the intermediate guides with respect to each other and to the center rail varies along the conveyor belt path.

The lower portion of the conveyor belt need not have any intermediate guides.

The center guide 151, intermediate guide 165, and the wear strips 133, 161 and 171 are all extruded parts.

When the conveyor belts 13A, 13B (see FIGS. 13 and 19) are installed into the supports, the tracks formed by lips 131 and the tracks formed by the center guide 151 are received by slots 67 in the ends of the links 25. Thus, each conveyor belt extends between a track formed by the lip 131 and a track formed by the center guide 151. The conveyor belts 13A, 13B are very close together, in the range of a fraction of an inch.

Of course, the invention can utilize a single conveyor belt instead of two conveyor belts. For a single conveyor belt, no center guide 151 is used. The slots in the ends of the links are supported by the lips 131.

The support subsystem 101 supports the conveyor belts off of the floor 173. In the preferred embodiment, the conveyor belt system bears on a floor 173 (see FIG. 19) by the use of leg supports 175. However, other types of vertical supports besides legs can be used. For example, the conveyor belt system can be suspended from a ceiling or beams.

Figure 20:
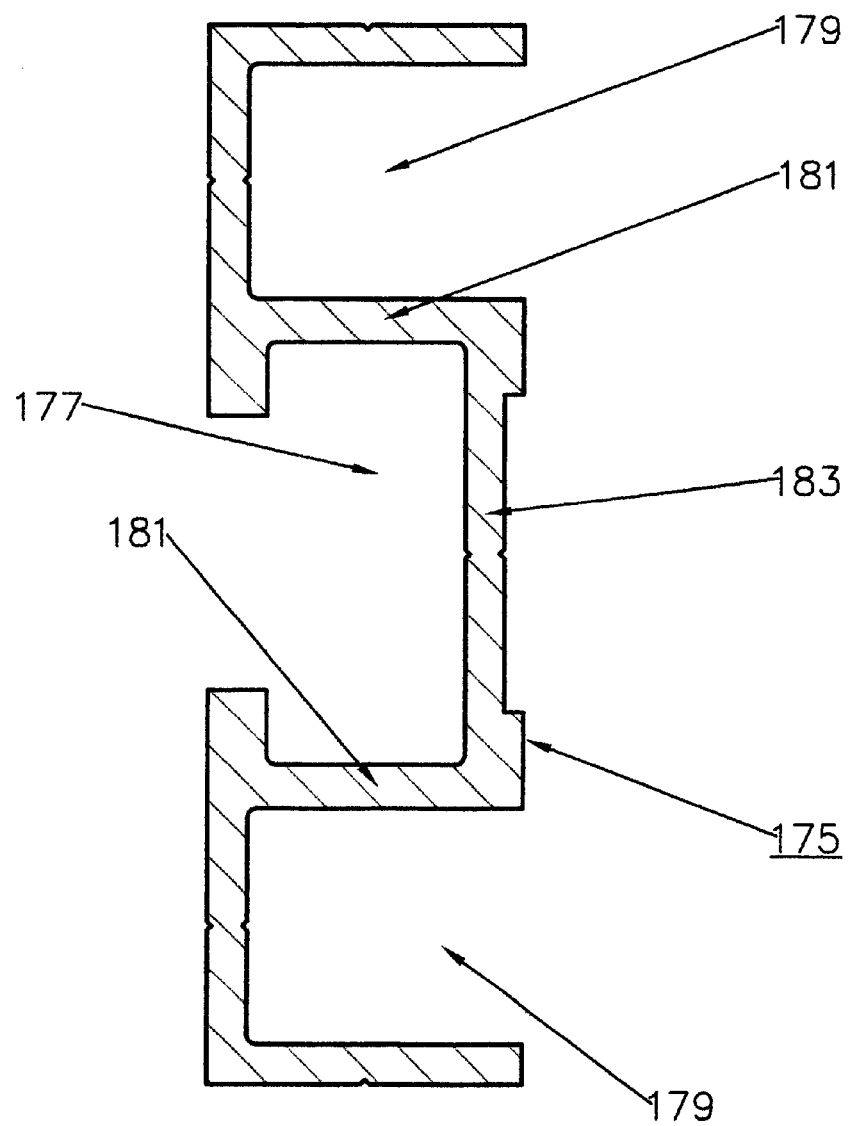
FIG. 20 is a transverse cross-sectional view of a leg support.

FIG. 20 shows a transverse cross-sectional view of a leg support 175, which is extruded. There is a central "C" shaped portion 177 flanked by two oppositely facing "C" shaped portions 179. The oppositely facing "C" shaped portions 177, 179 share common walls 181. The central "C" shaped portion 177 has a wall 183 that extends between the two common walls 181.

The leg supports 175 are coupled to the side frame members 103 and depend downwardly therefrom, as shown in FIG. 19. The wall 183 of each leg support 175 abuts against the walls 119, 125 and 142 (see FIG. 15) of the side frame members. Bolts extend through the wall 183 of the leg support 175 and are received by nuts in the cavities 128 (see FIG. 15) of the side frame member 103.

Figure 21:
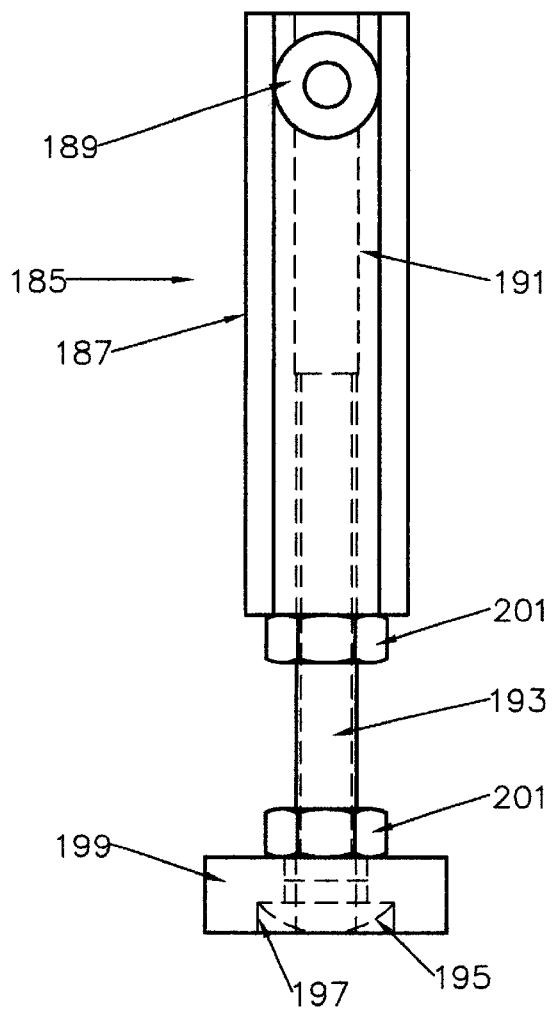
FIG. 21 is an elevational view of an adjustable foot assembly.
Figure 22:
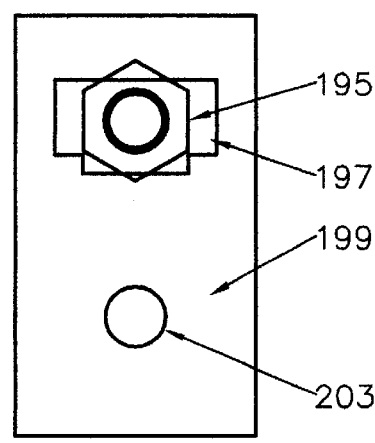
FIG. 22 is a top view of the foot.

In FIG. 19, the bottom ends of the leg supports are mounted to angle bracket type of feet 223. Bolts can be driven through the angle brackets 223 into the floor 173 to secure the entire system 11. An alternative foot structure 185 is shown in FIGS. 21 and 22. This foot structure 185 has an elongated block 187 that is received by the cavity of the "C" shaped portion 177 (see FIG. 20) of the leg support 175. One end of the block 187 has a cavity 189 therein for receiving a nut. A bolt couples the leg support to the block. The block has a bore 191 extending between the ends. The other end of the support has a bolt 193 extending out of the bore. The head 195 of the bolt 193 is received by a cavity 197 in the underside of a foot bracket 199 or plate. Two nuts 201 on the bolt shaft are used to space the block 187 (and the leg support 175) above the foot bracket 199 (and the floor). The foot bracket has another opening 203 for receiving an anchor, which anchor is the foot bracket to the floor.

FIG. 19 shows the conveyor belt as it might be used in a setting near customers, such as an airport. Trim panels 209, 211 are provided in order to limit access to the belts. In FIG. 19, there is a front side 205, where people can load/remove articles from the belts, and a back side 207. On the front side 205, the leg supports 175 do not extend above the conveyor belts. This allows people to easily access the belts. On the back side 207, the leg supports 175 can extend above the conveyor belts. The taller back side 207 can be used to hide controls, etc.

Figure 23:
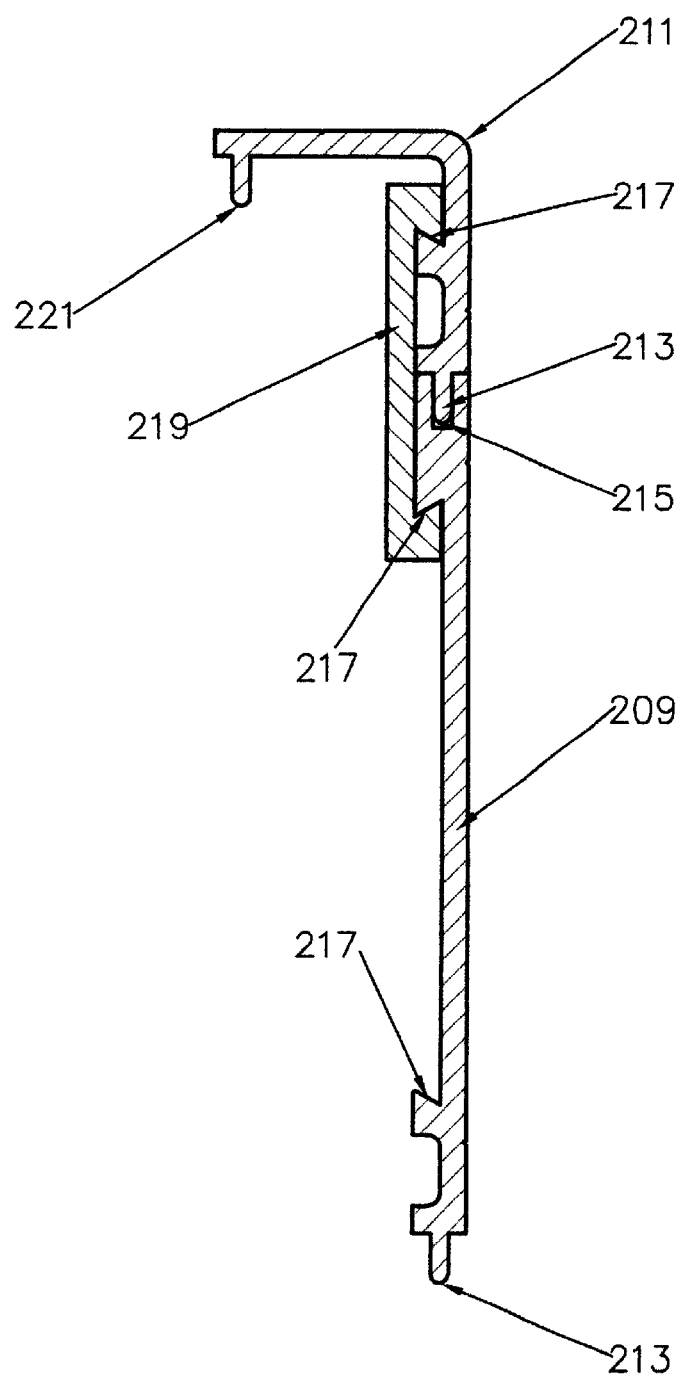
FIG. 23 is a transverse cross-sectional view of trim or guard panels.

The trim panels 209, 211 extend parallel with the side frame members 103. There are generally two types of trim panels, namely straight and angled 209, 211. The trim panels stack on top of each other, being coupled together with a tongue and groove arrangement. For example, referring to FIG. 23, an angled trim panel 211 has a tongue 213 that is received by a groove 215 in a straight trim panel 209. Each trim panel has a beveled lip 217 near the tongue or groove. When two panels are assembled together, a clamp 219 is placed around the oppositely facing beveled lips 217 in order to secure the trim panels together.

The angled trim panel 211 has a tongue 221 (see FIG. 19) at its free end. The tongue 221 is received by the channel 141 (see FIG. 15) in the side frame member 103. This secures the angled trim panel 211 on the front side 205 to the side frame member.

With the conveyor belt system, the conveyor belts are captured in a safe and secure manner. The ends 29 of the belts are captured by the tracks 131, 151. Very little space or gap is left exposed. Likewise, the underneath side of the belt is covered by the trim panels. Furtherstill, the plates and projections fill the gaps between the links. Thus, the conveyor belt system is safe so that it can be used in a public area such as an airport; a person will be unable to get a finger or other appendage stuck in the belts.

Figure 24:
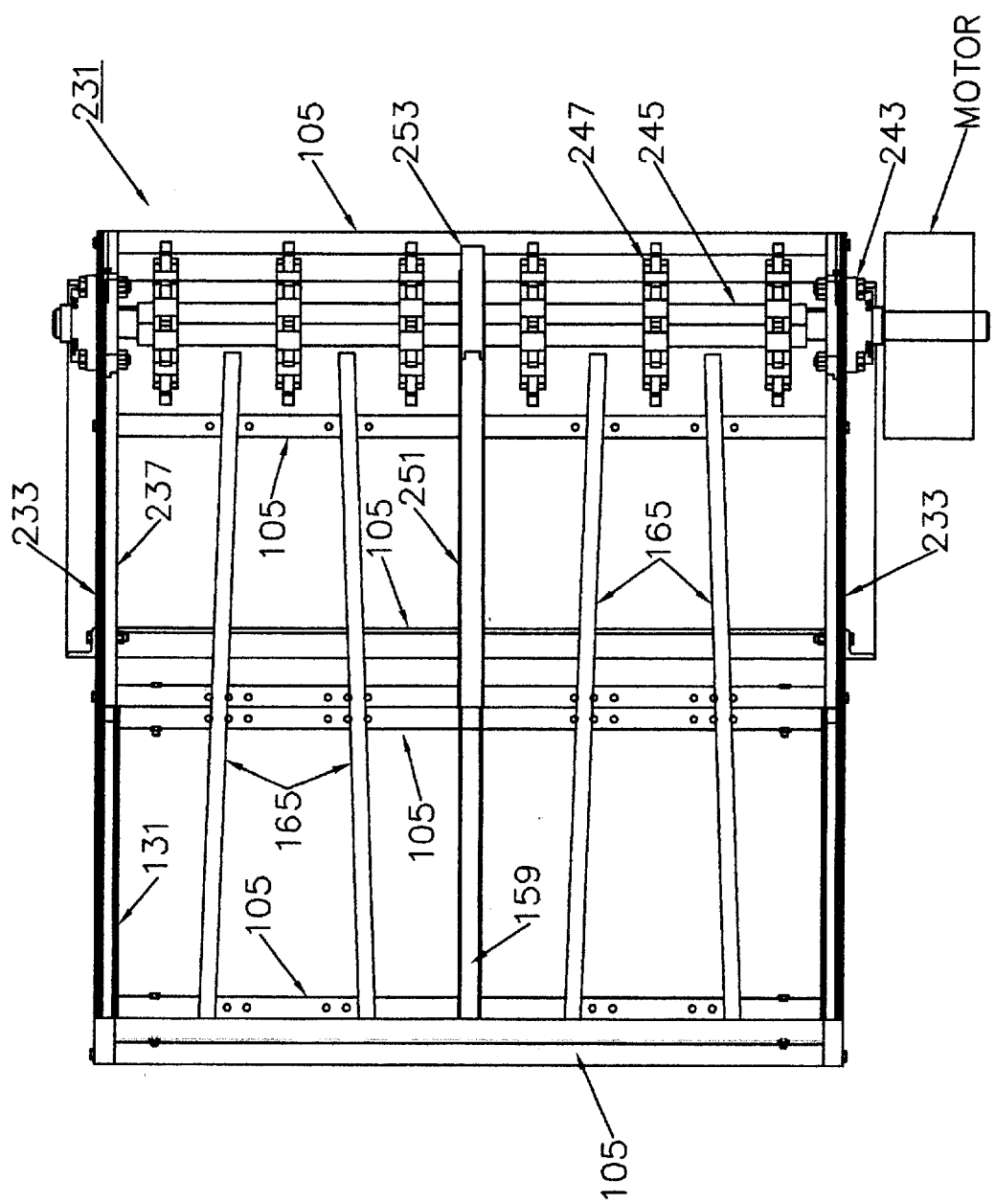
FIG. 24 is a top plan view of a turnaround subassembly.

The conveyor belts form a continuous loop. Turnarounds are provided, wherein belt lengths 25 move from the upper portion of the belt to the lower portion. FIGS. 24–26 illustrate a turnaround subassembly 231.

Figure 27:
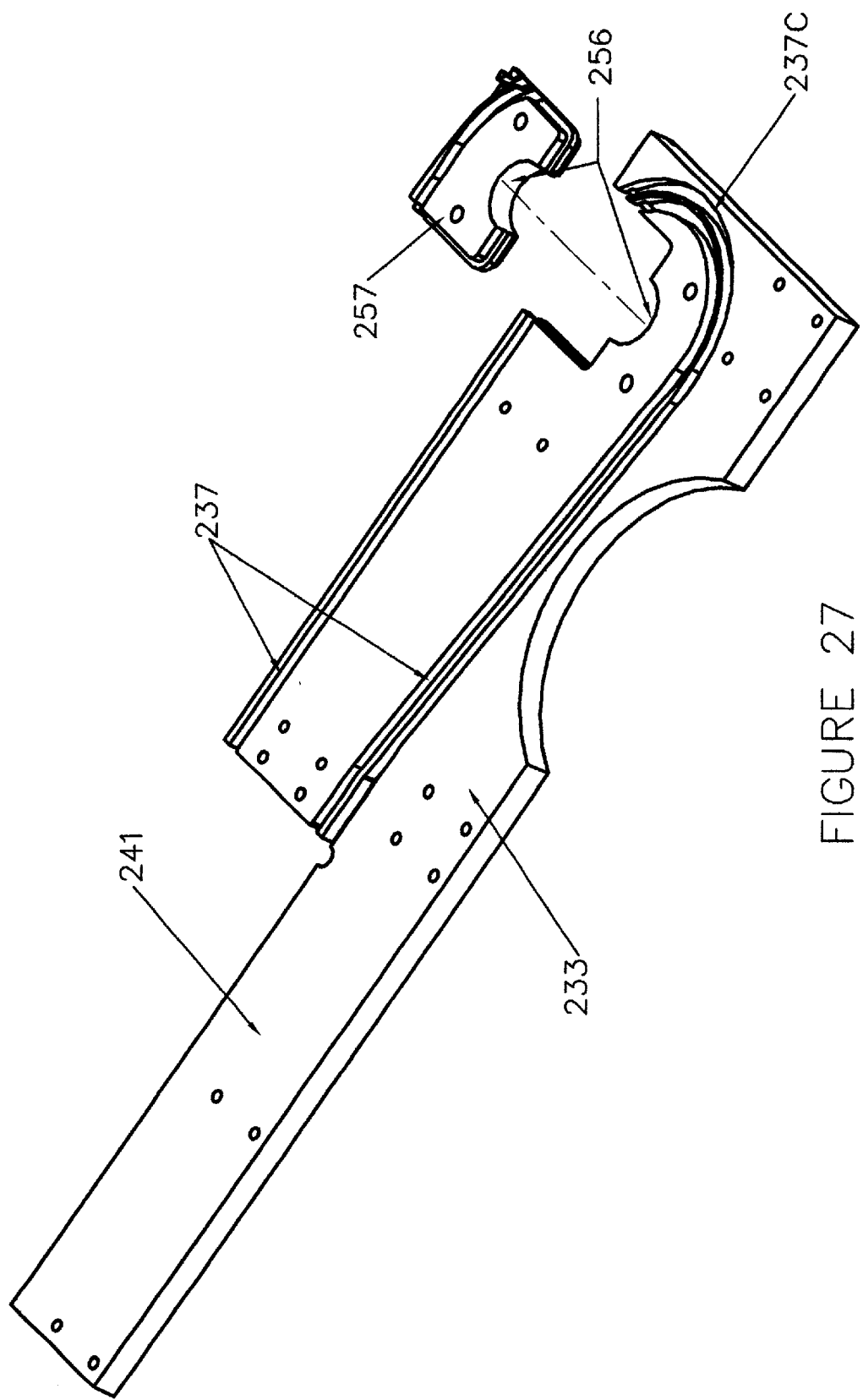
FIG. 27 is an isometric exploded view of a side plate of the turnaround assembly.

Referring to FIGS. 24 and 27, each turnaround subassembly 231 has a frame that is formed by side plates 233. The side plates 233 are coupled together by cross members 105. Each side plate 233 has a track 237 on its inside surface, as shown in FIG. 27. The track, which is received by the slots 67 in the ends 29 of the links 25, forms a curve so as to change the direction of the belt. The track need not have a wear strip. In the curved portion 237C of the track, the track is thinner than in the straight portions. This allows the links to traverse a path having a relatively small radius.

A side frame member 103 abuts against the side plate 233 (see FIG. 25) so that the lips 131 of the side frame member are aligned with the track 237, to form a continuous track. Because a wear strip is not used on the track 237, the thickness of the track 237 at the junction with the side frame member 103 is the same as the thickness of the wear strip 135. This provides a smooth transition between the wear strip and the track. The side frame member 103 is coupled to the side plate 233 by way of two cross members 105 that are bolted together. The side plate 233 has an arm 241 that extends below the side frame member 103 for a short distance.

The turnaround subassembly 231 is supported by leg supports 175 which are coupled to the side plates 233.

The side plate 233 has an opening 256 (see FIG. 27) for receiving a shaft 245 (see FIG. 24). A number of sprockets 247 are mounted on the shaft 245. The teeth of the sprockets 247 enter the gaps 37 of the links 25 and are used to drive the conveyor belts. A motor 249 rotates the shaft 245 and the sprockets 247. The motor can be fitted with a variable speed transmission, such as a variable frequency drive, which allows the belt speed to be adjusted.

The shaft is received by bearings 243 (see FIG. 24) mounted to the side plates 233. Each side plate 233 has an access panel 257 (see FIG. 27) that is slotted to fit into the side plate. The opening 256 is divided between the side plate 233 and the access panel 257. Removing the access panel 257 allows the shaft 245 and sprockets 247 to be lifted up from the turnaround subassembly 231.

A center guide 251 is provided in the turnaround subassembly 231. The center guide is formed in a center plate 253 (see FIG. 28). The center plate is mounted to the cross members 05; the openings 259 receive the cross members 105. The center plate 253 has tracks 255 and is aligned so that its tracks 255 are aligned with the tracks or lips of 159 of the center guide 151. Intermediate guides 165 are provided as well.

Figure 28:
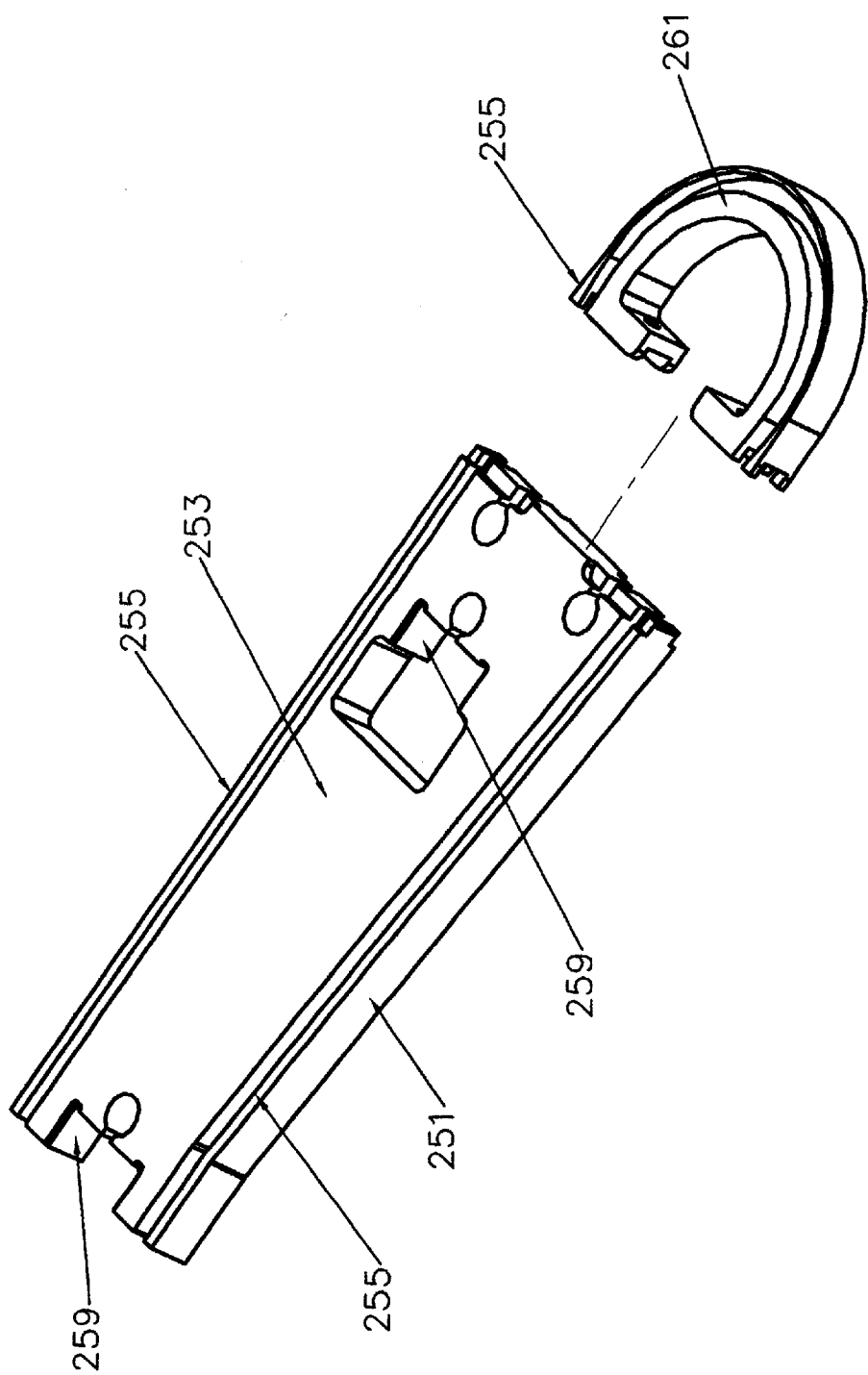
FIG. 28 is an isometric exploded view of a center plate of the turnaround assembly.

Referring to FIG. 28, the center plate 253 has a "C" shaped piece 261 (when held in such an orientation) that includes the curved portion of the track 255. The piece 261 can be disassembled from the remainder of the plate 253 as shown. The shaft 245 extends through the piece 261. Thus, when the piece 261 is removed from the plate 253, the shaft can be lifted out of the turnaround subassembly 231. The piece 261 is coupled to the plate 253 by bolts which are received by threaded holes in cylindrical slugs (not shown), which slugs are located in cylindrical openings of the plate 253.

As discussed previously, the links 25 can be driven in either direction. A drive sprocket 247 is used to drive the links. The sprocket 247 has teeth that are aligned with the gaps 37 either between the first set of projections or the gaps between the second set of projections.

When a sprocket tooth enters a gap 37, it contacts a driving surface. If the conveyor belt is being driven in the forward direction, the sprocket tooth engages the trailing side 33 of the rib 27. This trailing side is shown in cross-section in FIG. 9. The bottom portion 79 of the trailing side 33 is radiused toward the leading side 31. The top portion 81 of the trailing side 33 is, in the preferred embodiment, flat. This allows the link to be molded more simply, as the plate can be molded integrally with the rib and the projections. If the conveyor belt is being driven in the reverse direction, the sprocket tooth engages the leading side of the link by engaging the end 45 of a projection 35A in the first set of projections. The end 45 has a bottom portion 83 that is radiused in a similar, opposite manner from the bottom portion 79 of the trailing side 33 of the rib 27.

The operation of the conveyor belt will now be described. The articles 12A, 12B to be conveyed are located on the top of the plates 51. The drive mechanism engages the links to move the belt. The moving conveyor belt conveys the articles.

The conveyor belt, when traversing a straight section 15, is likely to be pulled. The individual links will spread out so that the spacing between adjacent ribs is maximized. The pintle prevents the links from being pulled completely apart.

The plates 51 cover the gaps 37 when the links 25 are pulled to their maximum extent. FIG. 11 shows this on the right side of the links 25, where the plates are pulled apart from each other. Thus, objects on top of the belt plates 51 are prevented from entering and becoming caught in the gaps. This is especially useful when the articles being conveyed have straps, clips, and other loose items that are susceptible of becoming caught.

Adjacent links can rotate with respect to each other about the pintle 43. This is useful when the conveyor belt traverses inclined sections 23 of the system, as well as returns at locations A and B.

In addition, the links can traverse radiused sections 21 of the system 11 (see FIGS. 11 and 12). When the belt is being pulled, the trailing and leading edges of the adjacent plates are separated. This separation allows the belt to traverse a radiused section. Referring to the orientation of FIG. 11, the belt in engaged in a left hand turn. The end 291 of the links on the inside of the curve are bunched together so that the leading and trailing edges 57L, 57T of the adjacent plates 51 are in contact, or nearly so. The ends 290 of the links on the outside of the curve are pulled apart so that the leading and trailing edges of adjacent plates are separated by a maximum distance. At the outside of the radiused section, the plates still serve to cover the gaps between the projections.

Thus, the plates 51 on the links 25 cover the gaps 37 to prevent catching articles therein, while providing movement between adjacent links so as to allow traversing of a radiused section.

In addition, the curved ends of each link make contact with the guides 15 along a tangential point. Reducing the area of contact between the ends of each link and the guides reduces the amount of chatter between adjacent links. This is especially useful for conveyor belts operating at high speeds.

The foregoing disclosure and the showings made in the drawings are merely illustrative of the principles of this invention and are not to be interpreted sense.

What is claimed is:

1. A link for a plastic conveyor belt, the belt being constructed of links interconnected by pivot rods into a sequence of hinged links for conveying articles along a path which path may include a curved portion, comprising:

a) a rib;

b) a first set of projections extending from the rib in a first direction, the individual projections of the first set being separated from each other by respective first gaps, the projections of the first set each having an opening therethrough, the openings in the first set of projections being aligned so as to receive a first pivot rod;

c) a second set of projections extending from the rib in a direction that is opposite of the first direction, the individual projections of the second set being separated from each other by respective second gaps, the projections of the second set being staggered with respect to the projections of the first set so that the first gaps can receive a second set of projections of a second link and the second gaps can receive a first set of projections of a third link, the projections of the second set each having a slotted opening therethrough, each of the slotted openings extending for a portion of the length of the respective projection of the second set, the openings in the second set of projections being aligned so as to receive a second pivot rod;

d) the link having two ends, with the rib extending between the ends;

e) a slot formed in each end of the link, each slot being formed by a pair of walls extending from an endmost projection in either the first or second sets of projections, the endmost projections being at respective ends of the rib, the walls forming the slot being integral to the endmost projection.

2. The link of claim 1 wherein each of the slots has an inside surface that is structured and arranged to contact a guide rail, the inside surface being arcuate so as to be convex.

3. The link of claim 2 wherein each of the walls that extend from the endmost projection to form the slot has an outside end surface, the outside end surfaces being arcuate so as to be convex.

4. The link of claim 1 wherein each of the walls that extend from the endmost projection to form the slot has an outside end surface, the outside end surfaces being arcuate so as to be convex.

5. The link of claim 1 wherein the rib, the first set of projections, the second set of projections and the walls forming each slot are integral.

6. A conveyor belt system for carrying articles along a path, which path may include a curved path, comprising:

a) first and second conveyor belts located side by side adjacent to each other, the first and second conveyor belts being guided along respective tracks;

b) each of the first and second conveyor belts comprising a plurality of links, with each of the links comprising a rib;

c) each of the links comprising a first set of projections extending from the rib in a first direction, the individual projections of the first set being separated from each other by respective first gaps, the projections of the first set each having an opening therethrough, the openings in the first set of projections being aligned so as to receive a first pivot rod;

d) each of the links comprising a second set of projections extending from the rib in a direction that is opposite of the first direction, the individual projections of the second set being separated from each other by respective second gaps, the projections of the second set being staggered with respect to the projections of the first set so that the first gaps can receive a second set of projections of a second link and the second gaps can receive a first set of projections of a third link, the projections of the second set each having a slotted opening therethrough, each of the slotted openings extending for a portion of the length of the respective projection of the second set, the openings in the second set of projections being aligned so as to receive a second pivot rod;

e) each of the links having two ends, with the rib extending between the ends;

f) a slot formed in each end of each link, each slot being formed by a pair of walls extending from an endmost projection in either the first or second sets of projections, the endmost projections being, at respective ends of the rib;

g) the end slots of each link receiving the tracks, there being a center guide serving as a center track between the first and second conveyor belts, the center guide having first and second lips extending in opposite directions from each other, the first and second lips being coupled to a mounting structure by a web, the first and second lips being received inside the end slots of the links in the first and second conveyor belts.

7. The conveyor belt system of claim 6 wherein the first and second lips comprise metal, with plastic being interposed between the first and second lips and the conveyor belt links.

8. A conveyor belt system for carrying articles along a path, comprising:

a) a plurality of plastic links, with each link having a rib, a first set of projections and a second set of projections;

b) the first set of projections extending from the rib in a first direction, the individual projections of the first set being separated from each other by respective first gaps, the projections of the first set each having an opening therethrough, the openings in the first set of projections being aligned so as to receive a first pivot rod;

c) the second set of projections extending from the rib in a direction that is opposite of the first direction, the individual projections of the second set being separated from each other by respective second gaps, the projections of the second set being staggered with respect to the projections of the first set so that the first gaps can receive a second set of projections of a second link and the second gaps can receive a first set of projections of a third link, the projections of the second set each having a slotted opening therethrough, the slotted opening extending for a portion of the length of the projection of the second set, the openings in the second set of projections being aligned so as to receive a second pivot rod;

d) the links being joined together with pivot rods such that the first set of projections are received by the second gaps and the second set of projections are received by the first gaps;

e) each of the links having two ends, with each of the ends having a slot therein, the slot being parallel to the first and second sets of projections;

f) two side frames spaced apart from each other, with each side frame having a first lip and a second lip, the first and second lips extending in an inside direction, the first and second lips being separated from each other by one or more cross members that couple the side frames together;

g) the conveyor belt having an upper portion and a lower portion, with the slots of the belt links in the upper portion of the conveyor belt receiving the first lips and the slots of the belt links in the lower portion of the conveyor belt receiving the second lips.

9. The conveyor belt of claim 1, wherein the side frames have outside surfaces, wherein the outside surfaces are adapted to engage vertical supports.

* * * * *